United States Patent [19]
Mackay et al.

[11] Patent Number: 5,454,101
[45] Date of Patent: Sep. 26, 1995

[54] DATA STORAGE SYSTEM WITH SET LISTS WHICH CONTAIN ELEMENTS ASSOCIATED WITH PARENTS FOR DEFINING A LOGICAL HIERARCHY AND GENERAL RECORD POINTERS IDENTIFYING SPECIFIC DATA SETS

[75] Inventors: Duncan C. Mackay, Vancouver; Babak Ahmadi, North Vancouver, both of Canada

[73] Assignee: Universal Firmware Industries, Ltd., Vancouver, Canada

[21] Appl. No.: 945,266

[22] Filed: Sep. 15, 1992

[51] Int. Cl.$^6$ ................................................ G06F 17/30
[52] U.S. Cl. .................. 395/600; 364/282.3; 364/282.4; 364/283.1; 364/283.2; 364/DIG. 1; 364/962.1; 364/963.5; 364/974.7; 364/DIG. 7
[58] Field of Search .................. 395/600; 364/282.3, 364/282.4, 282.1, 283.1, 962, 962.1, 963, 963.4, 963.5, 974, 974.3, 974.7, 283.2

[56] References Cited

U.S. PATENT DOCUMENTS

| | | | |
|---|---|---|---|
| 4,325,120 | 4/1982 | Colley et al. | 395/375 |
| 4,408,273 | 10/1983 | Plow | 395/200 |
| 4,468,728 | 8/1984 | Wang | 395/600 |
| 4,498,131 | 2/1985 | Bratt et al. | 395/400 |
| 4,498,132 | 2/1985 | Ahlstrom et al. | 361/825 |
| 4,638,424 | 1/1987 | Beglin et al. | 395/425 |
| 4,714,989 | 12/1987 | Billings | 395/700 |
| 4,945,475 | 7/1990 | Bruffey et al. | 395/600 |
| 5,115,504 | 5/1992 | Belove et al. | 395/600 |
| 5,129,083 | 7/1992 | Cutler et al. | 395/600 |
| 5,129,084 | 7/1992 | Kelly, Jr. et al. | 395/650 |
| 5,136,716 | 8/1992 | Harvey et al. | 395/800 |
| 5,175,852 | 12/1992 | Johnson et al. | 395/600 |
| 5,276,793 | 1/1994 | Borgendale et al. | 395/148 |
| 5,303,367 | 4/1994 | Leerstra, Sr. et al. | 395/600 |

FOREIGN PATENT DOCUMENTS

| | | |
|---|---|---|
| 0040694 | 12/1981 | European Pat. Off. . |
| 0474395 | 3/1992 | European Pat. Off. . |
| 0510210 | 1/1991 | Japan . |

OTHER PUBLICATIONS

Puchtey, G "B1000 DMSII: Designing And Developing Your Clone System" Buroughs World, Jul. 1984, pp. 24–25, vol. 5 Issue 7.
Browning, "Omines Quartz Open Windows", *PC Tech Journal* vol. v6 iss. no. 10, p. 112(11), Oct., 1988.
*Central Point PC Tools Dos Shell/File Manager* 1991 pp. 63–64 and 78–81, Central Point Software, Inc.

*Primary Examiner*—Thomas G. Black
*Assistant Examiner*—Jack M. Choules
*Attorney, Agent, or Firm*—Merchant, Gould, Smith, Edell, Welter & Schmidt

[57] ABSTRACT

In a computer having one or more secondary storage devices attached thereto, a Finite Data Environment Processor (FDEP) manages Data Sets residing on the secondary storage devices and in memory using Set Lists (SLs) and General Record Pointers (GRPs). The Data Sets contain either data or logical organizational information. The Set Lists comprise Data Sets organized into a hierarchy by listing a identifier for each of the data sets with a corresponding identifier for the logical parent of that data set. These set lists are also data sets and can be identified as child or parent in a set list. The General Record Pointers identify information in terms of Data Sets and records within them. Using the principal idea that a Data Set is uniquely identifiable, the present invention eliminates problems normally associated with referencing the location of data after the data has been moved.

39 Claims, 24 Drawing Sheets

DIRECTORY STRUCTURE

SET LIST REPRESENTATION

| SET=A | PARENT SET = NULL |
|---|---|
| SET=B | PARENT SET = A |
| SET=C | PARENT SET = A |
| SET=D | PARENT SET = A |
| SET=E | PARENT SET = C |
| SET=F | PARENT SET = C |
| SET=G | PARENT SET = C |

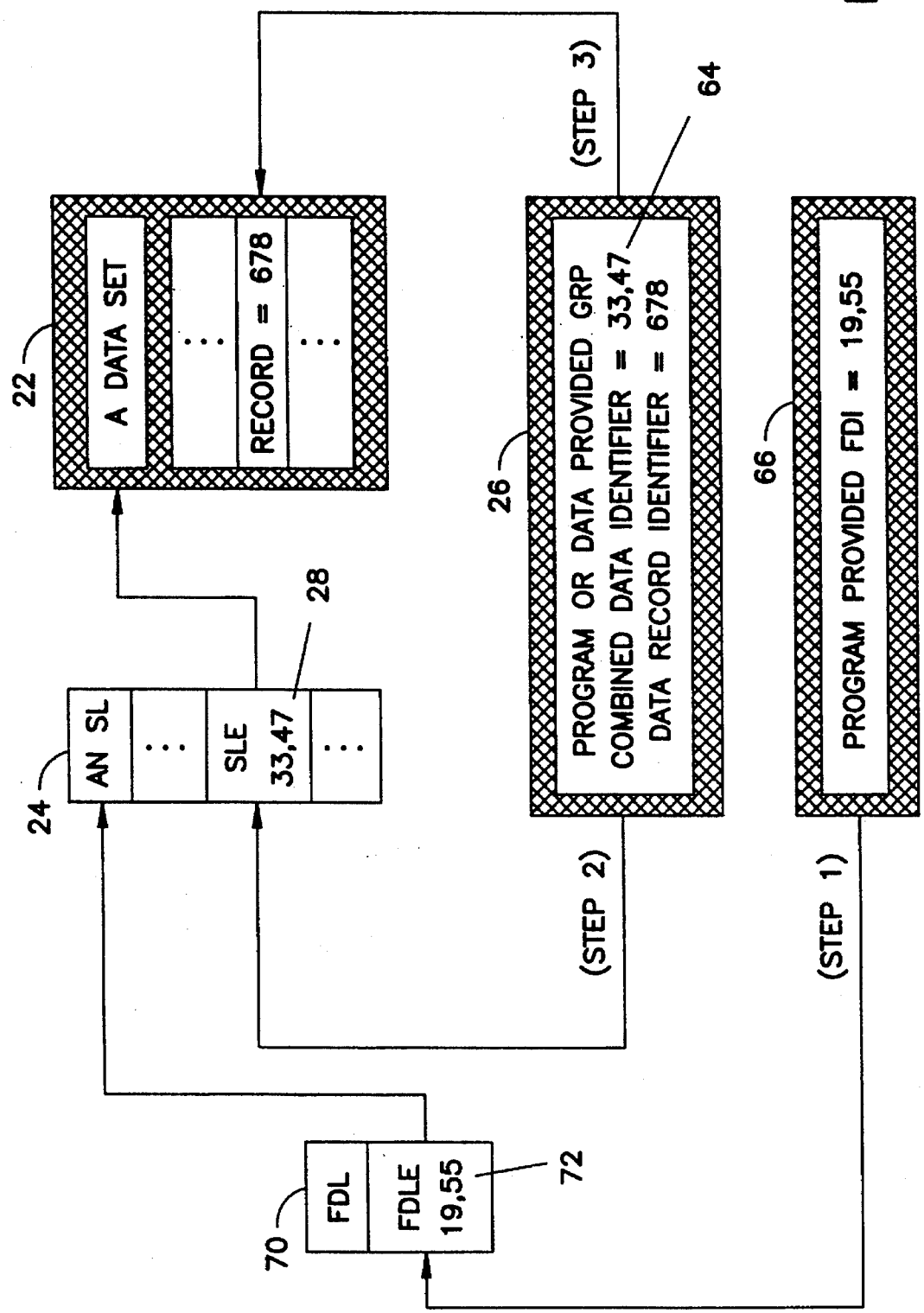

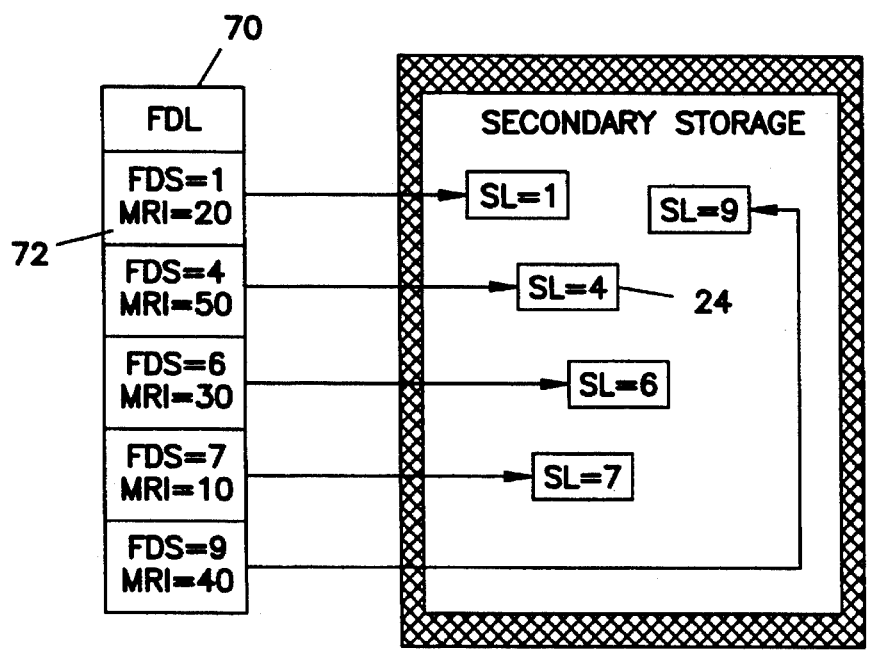
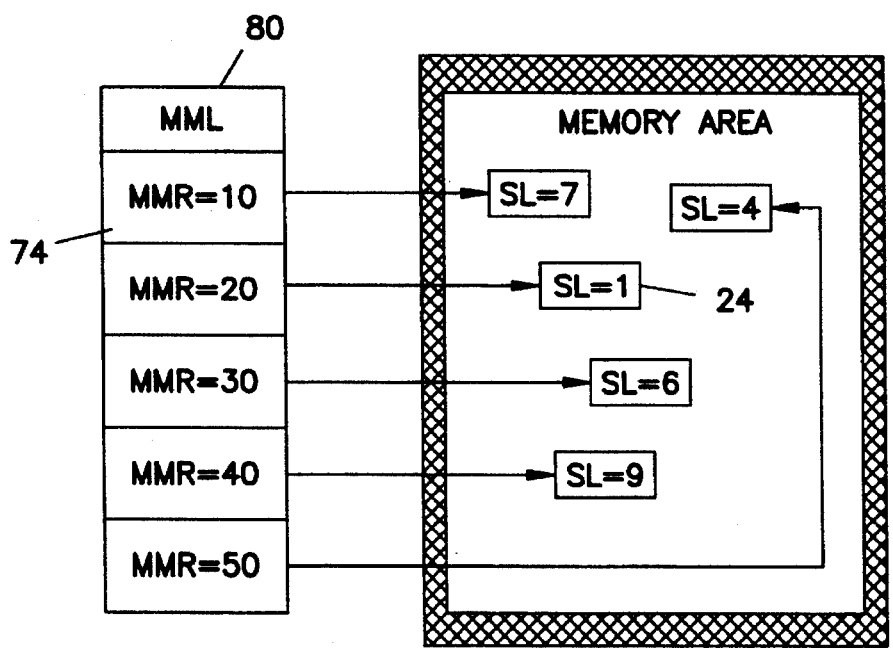
FIG. 11

| STEP | DESCRIPTION | COMPONENT | CUMULATIVE |
|---|---|---|---|
| 1 | INITIAL DATA SET | "\F" | "\F" |
| 2 | PARENT OF "F" IS "C" | "\C" | "\C\F" |
| 3 | PARENT OF "C" IS "A" | "\A" | "\A\C\F" |
| 4 | PARENT OF "A" IS NULL | NO CHANGE | "A\C\F" |

FIG. 17

BEFORE
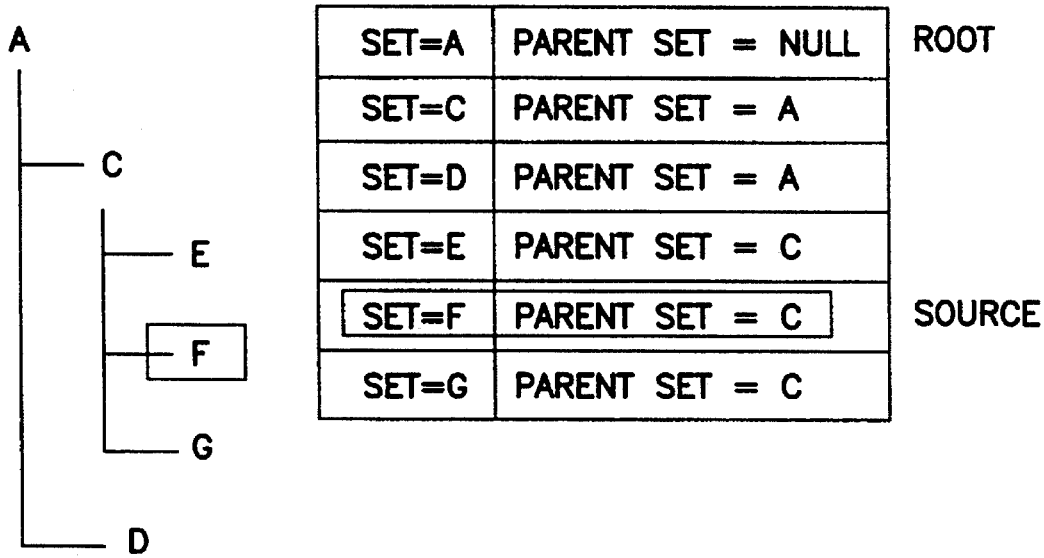
AFTER
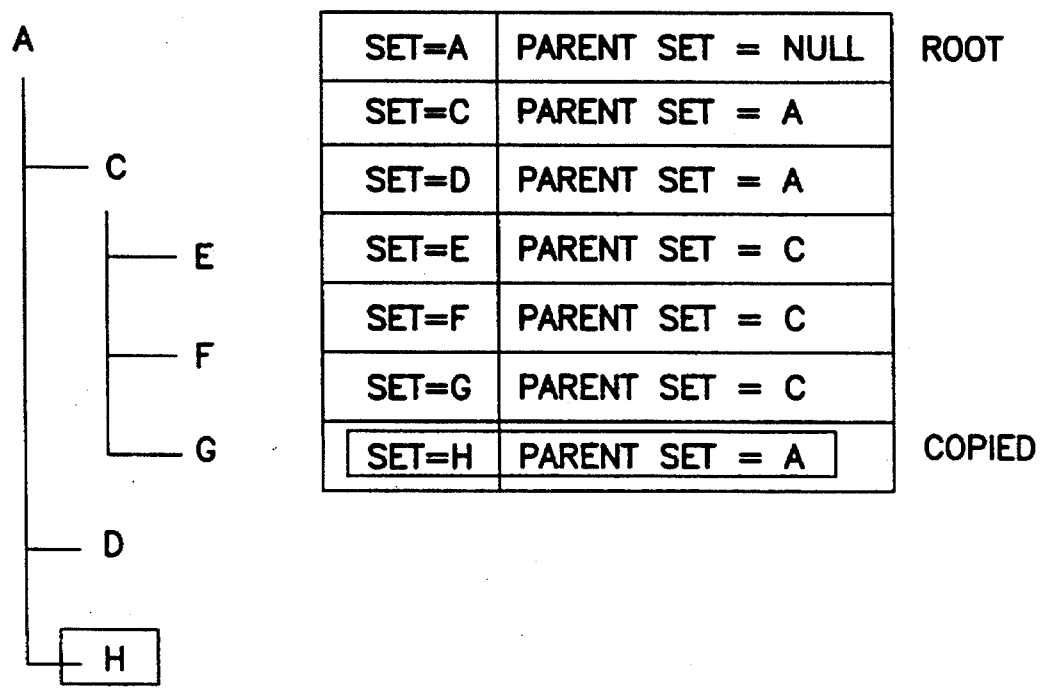
FIG. 18

BEFORE

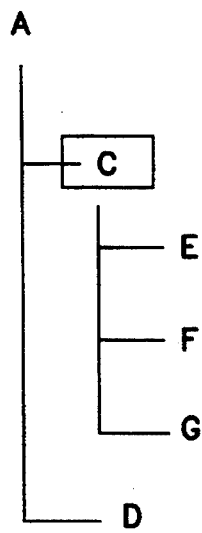

| SET=A | PARENT SET = NULL | ROOT |
| SET=C | PARENT SET = A | SOURCE |
| SET=D | PARENT SET = A | |
| SET=E | PARENT SET = C | |
| SET=F | PARENT SET = C | |
| SET=G | PARENT SET = C | |

AFTER

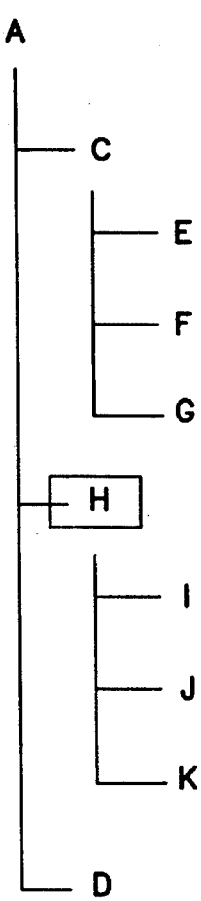

| SET=A | PARENT SET = NULL | ROOT |
| SET=C | PARENT SET = A | |
| SET=D | PARENT SET = A | |
| SET=E | PARENT SET = C | |
| SET=F | PARENT SET = C | |
| SET=G | PARENT SET = C | |
| SET=H | PARENT SET = A | COPIED |
| SET=I | PARENT SET = H | COPIED |
| ST=J | PARENT SET = H | COPIED |
| SET=K | PARENT SET = H | COPIED |

FIG. 19

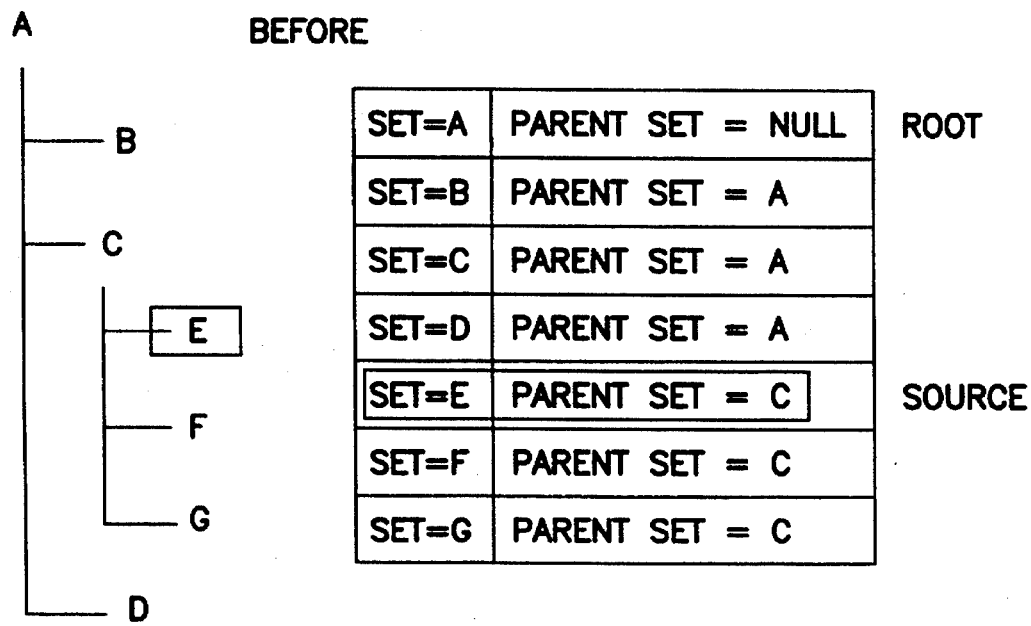
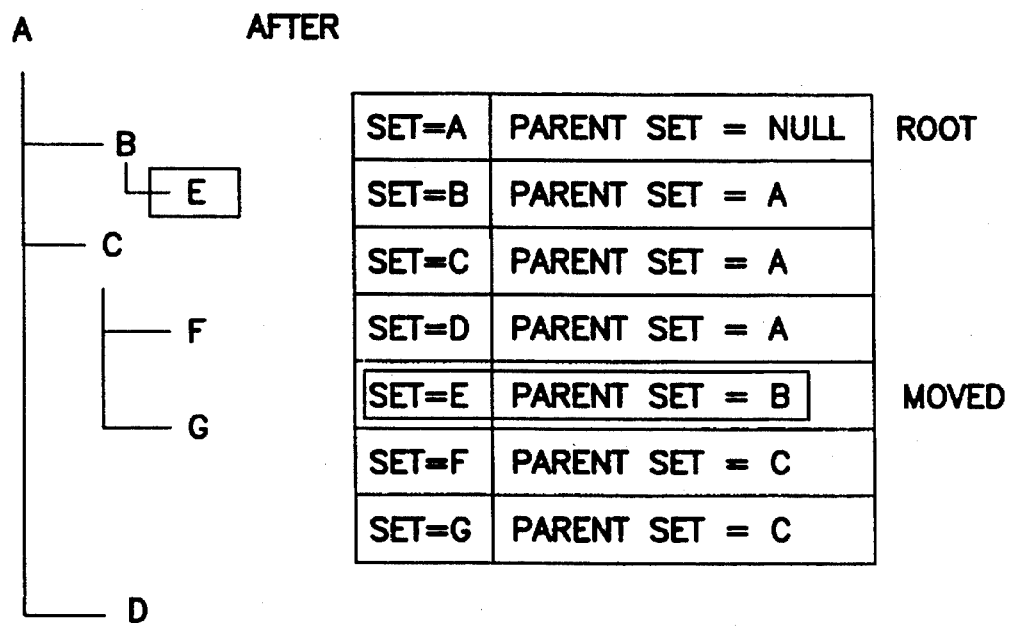
FIG. 20

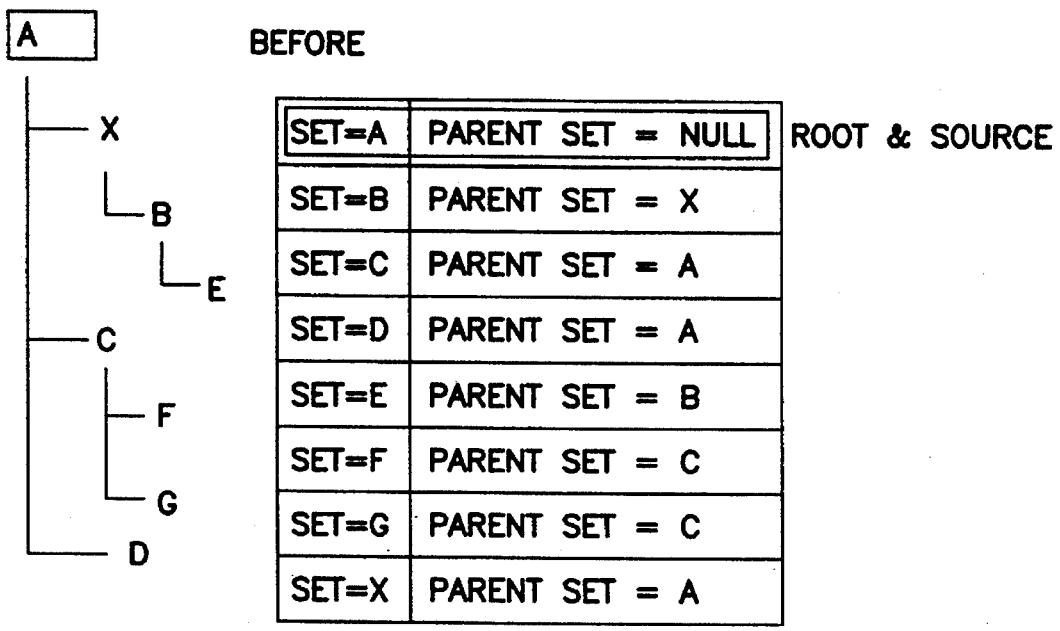
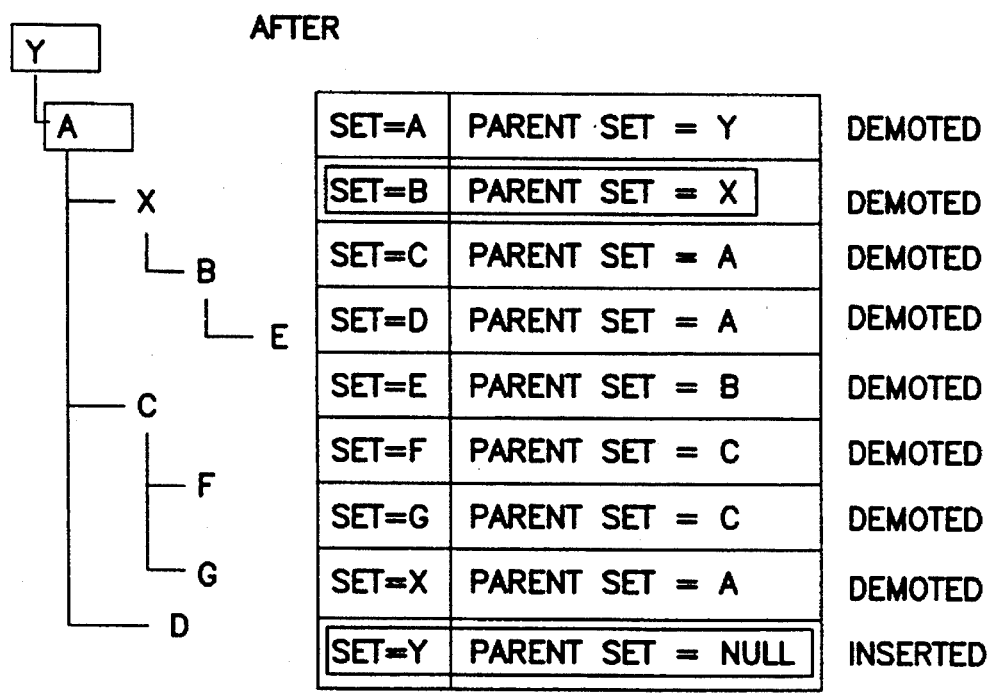
FIG. 23

DATA STORAGE SYSTEM WITH SET LISTS WHICH CONTAIN ELEMENTS ASSOCIATED WITH PARENTS FOR DEFINING A LOGICAL HIERARCHY AND GENERAL RECORD POINTERS IDENTIFYING SPECIFIC DATA SETS

BACKGROUND OF THE INVENTION

1. Field of the Invention

This invention relates in general to computer operating systems, and in particular, to a method for storing and retrieving data in a computer system.

2. Description of Related Art

One problem, which has been retained throughout the history of digital computing, is the inability to directly identify a data entity, have the ability to move it, and still maintain all references to the entity.

For example, consider the state-of-the-art methods of information storage. One state-of-the-art method is a containment technique where an entity (directory) contains a list of subordinate entities (directories or files). Although the containment method is highly effective in ordering information, it does not support the general ability to access information after the information has been moved. Moving data within a hierarchy inevitably leads to the invalidation of existing links to the information moved. There are three prior art solutions to this problem.

The first solution is the concept of a current or working directory. A current directory is a state where a program identifies a particular location within secondary storage and all operations assume information is located in this directory or is subordinate to it.

The second solution is an absolute path. An absolute path is where a program identifies information by a stream of hierarchically dependant entities which are concatenated together to form an absolute data specification. Thus, if "C" is within "B" and "B" is within "A", then an absolute path would be "\A\B\C".

The third solution is the concept of search path. A search path is a list of predefined locations where programs and sometimes program data are stored. If a body of requested data is not within the search path or the current directory, then it is assumed not to exist. Note many systems use combinations of these methodologies.

However, there remains the problem, common to all the state-of-the-art methodologies defined above, of maintaining information links to data which has moved. Consider a program which accesses data with an absolute path \A\B\C. If the data located in C is moved to a different location, then the program will not be able to locate the data it needs. Further, consider a program which uses the concept of current directory, where the data file is moved out of the current directory. Finally, consider the program which uses data located in a search path, where the data is moved to a directory not in the search path. In all of these instances the data is effectively lost to the program. The same reasoning applies to data within a database. Consider the examples above but replace directories with files and files with sets of records.

Thus, the problem is how to retain direct information links when data is moved. In almost all cases, the information link is recorded in a static image, such as a program or in a database.

The solution to the problem of directly linking information and still having the ability to move it, is dependant on altering some of the basic perceptions regarding information structure. The state-of-the-art approach is to use volumes, directories and files to identify each data entity. Where volumes and directories are methods of containment. Specifically, a volume physically contains directory identifiers and directories physically contain file identifiers. Thus, all files and directories identified within a volume must physically exist within that volume.

The basic premise of the containment method of information structure storage is that a hierarchy is based on more significant entities physically containing less significant entities. Although this premise works, it is not efficient in that it prohibits several of the characteristics identified below. The following are perceptional modifications required to understand the present invention.

First, a data object may logically belong to a larger data object, but that does not mean it has to be physically contained within it. For example, a directory can contain many file identifiers, but that does not mean the file identifiers must be physically contained in the directory. In the present invention, each file identifier can identify the directory it belongs to and a more effective information structure storage method can be used.

Second, all information structure is hierarchical to some degree. When information ceases to have a hierarchical structure (for example relational), the existing containment method (volume, directory, file) of storing hierarchical structure does not work unless additional intermediate processes are used. The present invention can support direct links to information at a fundamental level and can therefore directly support non-hierarchical information structures such as relational or object oriented, where the containment method cannot.

Third, the amount of data structure required by any process may vary in size, depth and width. Therefore, any mechanisms, which cannot handle extremes in size, depth and width are ineffective. For example, consider a directory with 10,000 file identifiers and the problems associated with its use and maintenance when in memory. The present invention experiences similar space restrictions, but does not experience as many or as severe problems as containment methodology with regard to use or maintenance.

Fourth, the amount of space required to uniquely identify a data entity deep within a hierarchy can be excessive using standard containment methodology. The containment method of uniquely identifying a data entity becomes progressively less efficient as depth within a hierarchy increases. For example, the following are two strings to identify a body of data deep in a hierarchical structure:

1—"C:\ACC_PROG\YEAR1992\ACCOUNTS\ONTARIO\TORONTO\CASH.DB"

2—"C:\MY_DISK12\VOLUME_A\UTILS_AC\ACC_PROG\YEAR 1992\ACCOUNTS\ONTARIO\TORONTO\CASH.DB"

The first data identifier is over 50 bytes long and could easily be much longer as depicted in the second data identifier, which is over 80 bytes. In the present invention, a direct reference is a maximum of 20 bytes long, regardless of how deep the reference is within a hierarchy.

Fifth, it is safe to assume that information moves. The containment method of storing information structure requires the data identifier to move when the data moves. This produces two problems, the overhead of moving the identifier and more importantly, the problems associated with losing links to the data moved. The present invention ensures that data links are retained, regardless of where the data is moved to.

Finally, information accessed via direct links are faster than indirect links. The containment method of data-structure-storage uses names to identify a data entity. This means that the location of a data identifier is established by a search, which is seldom a binary search and never an aggregate indexed reference. As a result, the overhead associated with locating a body of data using the containment methodology is slow and cumbersome. The present invention of data-structure-storage is efficient because data location is either a binary search or an aggregate indexed reference.

SUMMARY OF THE INVENTION

To overcome the limitations in the prior art described above, and to overcome other limitations that will become apparent upon reading and understanding the present specification, the present invention discloses a method and apparatus for data storage and retrieval. In a computer having one or more secondary storage devices attached thereto, a Finite Data Environment Processor (FDEP) manages Data Sets residing on the secondary storage devices and in memory using Set Lists (SLs) and General Record Pointers (GRPs). The Data Sets contain either data or logical organizational information. The Set Lists comprise Data Sets organized into a hierarchy. The General Record Pointers identify information in terms of Data Sets and records within them. Using the principal idea that a Data Set is uniquely identifiable, the present invention eliminates problems normally associated with referencing the location of data after the data has been moved.

BRIEF DESCRIPTION OF THE DRAWINGS

Referring now to the drawings in which like reference numbers represent corresponding parts throughout:

FIG. 9 is a block diagram illustrating the data structures used to resolve a General Record Pointer;

FIG. 11 is a block diagram illustrating the logic used to locate a Finite Data Set;

FIG. 17 illustrates the path structure of the Finite Data Set in FIGS. 8A and 8B;

FIG. 18 illustrates the results of a simple single Data Set copy operation;

FIG. 19 illustrates the results of a Data Set copy operation which includes subordinate hierarchy;

FIG. 20 illustrates the results of a Data Set move operation;

FIG. 23 illustrates the results of a second Data Set insertion operation; and

DETAILED DESCRIPTION OF THE PREFERRED EMBODIMENT

Figure 1:
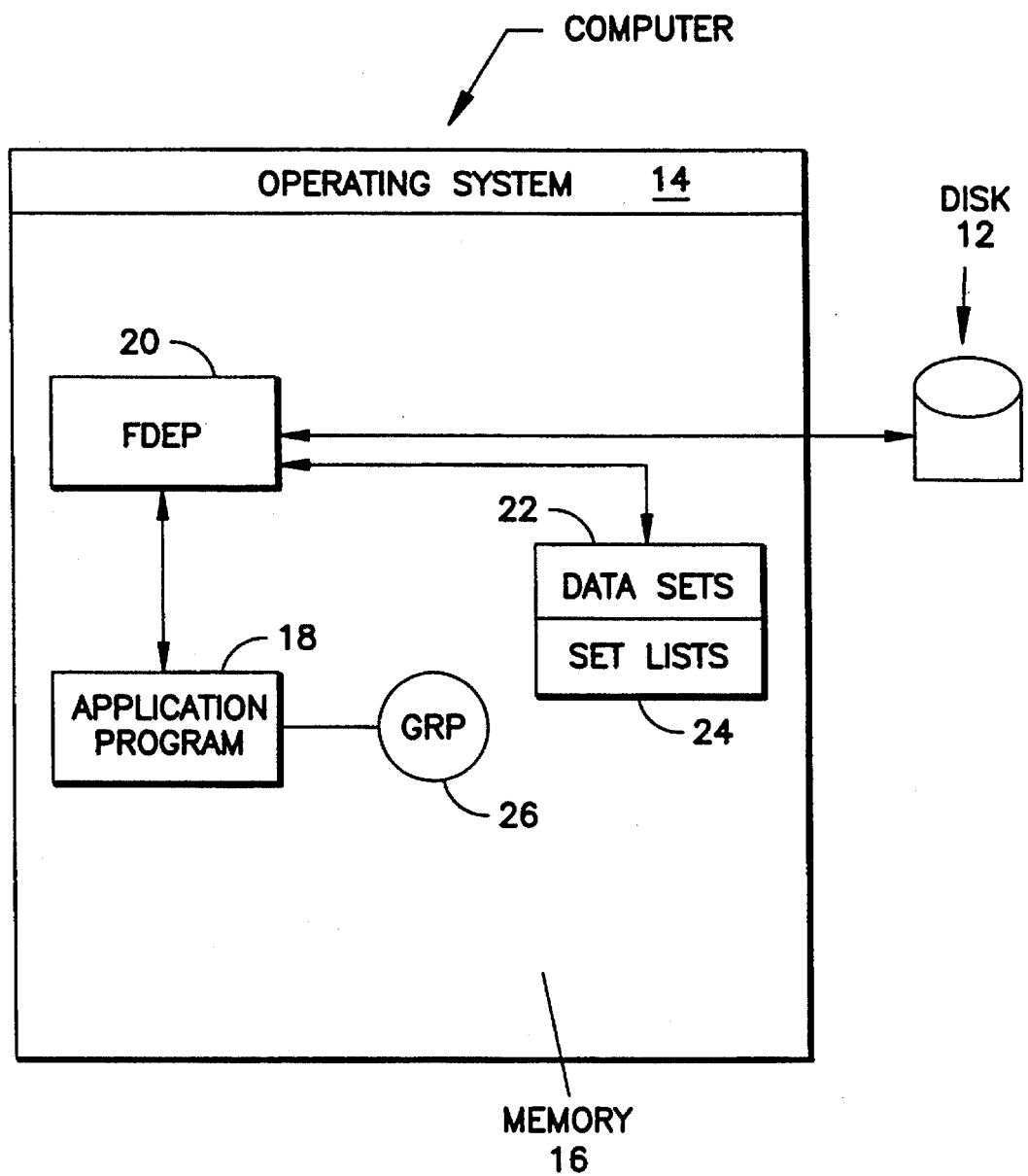
FIG. 1 is a block diagram illustrating the environment in which the present invention operates.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

GLOSSARY

CDI Combined Data Identifier

A CDI is an 8-byte field consisting of a 4-byte Site Owner Identifier and a 4-byte Data Set Identifier. A CDI is used to uniquely identify a Data Set. A CDI used in conjunction with a Data Record Identifier constitutes a General Record Pointer.

CDS Containment Data Set

A CDS is a class of Data Set which may logically contain any number of other Data Sets as children. However, a CDS has exactly one immediate parent. A CDS can contain all Data Set classes. The CDS does not identify its children; instead, all children (Set List Elements) identify the CDS as their parent. All children of a CDS exist in the same Set List. A CDS obeys the Hierarchical Organization Rules when existing in a hierarchy. A CDS is strictly a logical entity in that, no real physical data is ever present. A CDS is used to define a conventional hierarchical information structure such as the drive/directory/file structures of MS-DOS and UNIX. Each CDS at a Site can be reached via an Set List Element, and has no further physical representation.

DRI Data Record Identifier

A DRI is a 4-byte field which identifies a single record within a given Data Set. If a DRI within a General Record Pointer is set to null (represented by a one's complement −1), then it identifies the entire Data Set. A General Record Pointer which has all fields set to null is a null General Record Pointer.

DSI Data Set Identifier

A DSI is a 4-byte field which identifies one Data Set within a given Finite Data Environment. Note that an DSI may not be unique (by itself) when Set List Elements from other Sites are imported. If data is not imported into a Site, then an DSI will be unique.

EGRP External General Record Pointer

An EGRP is a 20-byte data identifier. An EGRP consists of a 4-byte Finite Data Set Site Owner Identifier, a 4-byte Finite Data Identifier, a 4-byte Data Set Identifier Site Owner Identifier, a 4 byte Data Set Identifier and 4-byte Data Record Identifier as a single record. An EGRP will uniquely identify a unique Data Set absolutely anywhere.

FDEP Finite Data Environment Processor

An FDEP is the process which maintains Set Lists and all related structures and information. There is exactly one FDEP for a given Site. An FDEP is assumed to have a unique serial number, which is used as the Site Owner Identifier when a new Finite Data Set (or Set List Element) is created.

FDI Finite Data Identifier

An FDI is structurally identical to a Combined Data Identifier, i.e., a 4-byte Site Owner Identifier and a 4-byte Data Set Identifier. The difference between a Combined Data Identifier and a Finite Data Identifier, is a Finite Data Identifier only identifies Set Lists, never a Containment Data Set or a Physical Data Set. A Combined Data Identifier can identify any Data Set class (and therefore type).

FDL Finite Data List

An FDL is an array or list of records which identify a specific Finite Data Set and the location of its Set List in secondary storage. There is exactly one FDL on a Site. All Finite Data Sets (and therefore Set Lists) at a Site are identified in the FDL.

FDS Finite Data Set

An FDS is both a class and a type of Data Set. An FDS can have all Data Set classes (Containment Data Set, Finite Data Set, and Physical Data Set) as its children (or subordinates). An FDS may have one or more parents. This enables an FDS to exist at several different levels of logical hierarchy, without duplication. Each FDS at a Site can be reached via a unique Finite Data List Element, and is represented by a unique Set List. In addition, an FDS is also represented by the various Set List Elements (in other Set Lists) that point to it. All control data (Set List Elements) for all data within an FDS are completely contained by that FDS. However, an FDS represents no real physical data. The FDS is used throughout the present invention to provide new and efficient ways of accessing and organizing data.

GRP General Record Pointer

A GRP is an 12-byte data identifier. A GRP consists of a 4-byte Site Owner Identifier, a 4-byte Data Set Identifier and a 4-byte Data Record Identifier. A GRP uniquely identifies a given data entity anywhere. However, when a Data Set is referenced which is not in the current Set List, a search must be performed to located it. For this reason the External General Record Pointer is a convenience, added to enhance GRP access speed.

MMR Memory Maintenance Record

An MMR is a record used to maintain information specific to a Data Set or set list located in memory.

MRI Memory Record Identifier

An MRI is a 4-byte field which contains the number of a specific Memory Maintenance Record. The MRI is used as the key field in Memory Maintenance Records for sorting and location.

MSL Master Set List

An MSL is a Set List which identifies the overall structure of information at a given Site. An MSL has exactly the same structure as a Set List. There is exactly one MSL for a Site and all Finite Data Sets within that Site will exist within the Finite Data Set embodied by the MSL.

PDS Physical Data Set

A PDS is a class of Data Set which identifies a physical data entity (e.g., a record, a list). Since it is a physical entity, a PDS may not contain any other Data Sets as children. However, a PDS still retains a logical connection by identifying exactly one immediate parent. A PDS obeys the Hierarchical Organization Rules when existing in a hierarchy. A PDS is used to store actual bytes (or records) of information. Note that the parent of a PDS may be a Containment Data Set or a Finite Data Set. Each PDS at a Site can be reached via a unique Set List Element, and is represented by a unique physical data body (in secondary storage and RAM).

SAI Storage Address Identifier

An SAI is a 12-byte field consisting of a 2-byte Storage Device Number, a 4-byte Remote Disk Number, and a 6-byte Offset Within The Storage Device. The first field allows for a maximum of $2^{16}-1$ storage devices. The second field services all storage media with removable "disks". This includes floppy, tape, floptical, removable-hard-drive, etc. By setting the second field to appropriate disk number, data can be located uniquely across many disks. This field can be used to automatically indicate a "disk" number to a program or end-user. The second field supports a maximum of $2^{32}-1$ removable disks per device. The third and last field in the SAI is a relative offset into the device. If remote disk number is non-null, then this is an offset in that disk. The third field is always an absolute address within that device. The third field supports an address space of $2^{48}-1$ bytes.

Site

A Site is a one or more computers using a common series of secondary storage devices and a common Finite Data Environment Processor.

SL Set List

An SL is an array or list of Set List Elements which define the hierarchy of an Finite Data Set. An SL is always sorted based on the Self Identifier field of the Set List Elements.

SLE Set List Element

An SLE is a record which contains all control and structure information related to a given Data Set. An SLE contains a Self Identifier field by which it can be located and sorted.

SOI Site Owner Identifier

An SOI is a 4-byte field which contains a unique identifier associated with exactly one Site. An SOI is unique and can be used to identify the Site from which a given Finite Data Set originated. An SOI is provided by the Finite Data Environment Processor when a new Finite Data Set or Set List Element is created. The Finite Data Environment Processor is assumed to have a serial number for each occurrence. The SOI is that serial number.

COMPONENTS AND CONCEPTS

FIG. 1 is a block diagram illustrating the environment in which the present invention operates. A computer 10 has one or more secondary storage devices 12 attached thereto. The computer 10 operates under the control of an operating system 14 resident in the memory 16 of the computer 10. The operating system 14 controls the execution by the computer 10 of both application programs 18 and a Finite Data Environment Processor (FDEP) 20. The FDEP 20 manages Data Sets 22 residing on the secondary storage devices 12 and in memory 16 using Set Lists (SLs) 24 and General Record Pointers (GRPs) 26. The Data Sets 22 are the building blocks on which all the other components operate. The SLs 24 are comprised of Data Sets 22 organized into a hierarchy. The GRPs 26 identify information in terms of Data Sets 22 and records within them. The FDEP 20 is a process that performs functions on one or more Data Sets 22. The following sections describe these basic components and concepts in more detail.

DATA SETS

A Data Set 22 may be an array or list of records or contiguous binary data. A Data Set 22 is either a logical entity such as a directory, or a physical entity such as a file. The principle idea of the present invention is that a Data Set 22 is uniquely identifiable, so the problems normally associated with referencing the location of data are not an issue.

SET LISTS

Figure 2:
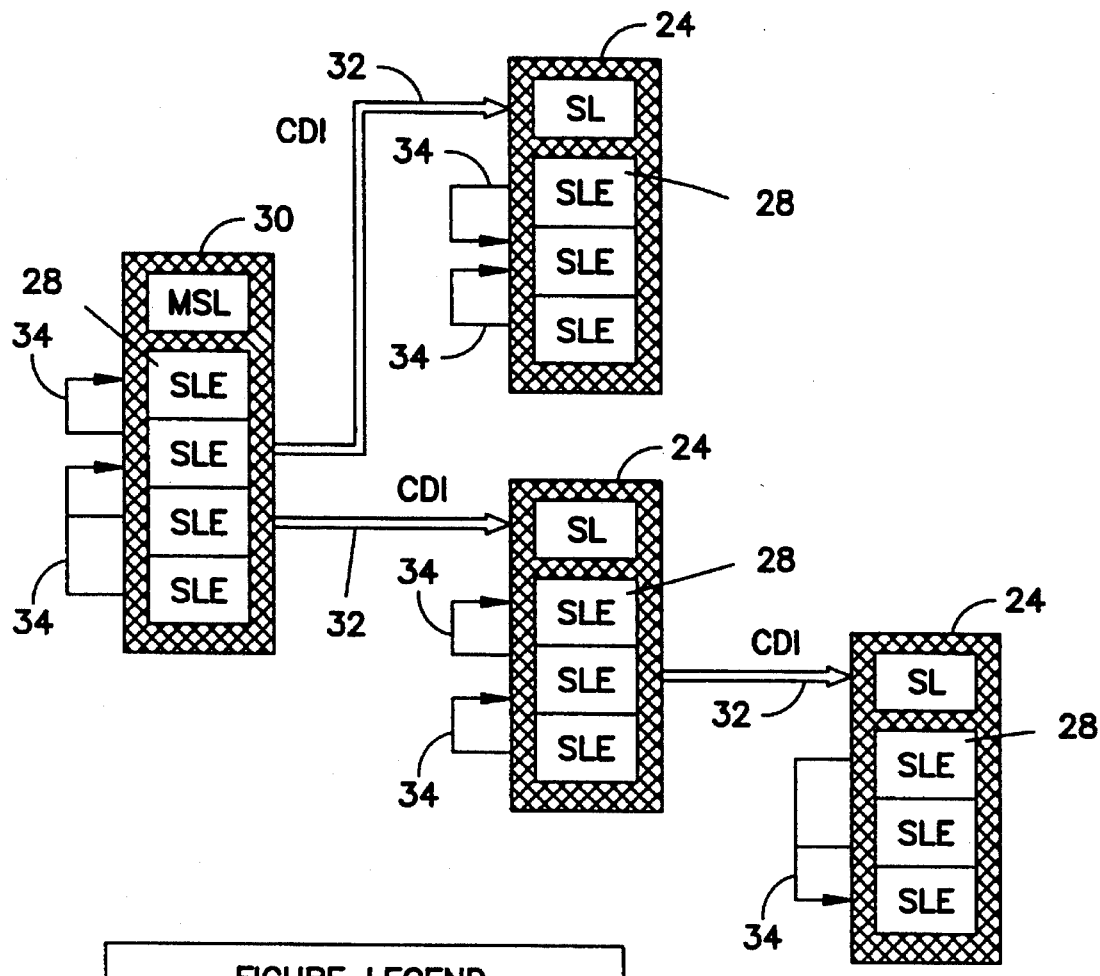
FIG. 2 illustrates the structure of a Set List.

FIG. 2 illustrates the structure of a Set List (SL) 24. An SL 24 is a Data Set 22 comprising a list of records 28 which identify a relative relationship between a Data Set 22 and those Data Sets 22 it is logically contained within. Thus, an SL 24 stores hierarchical information by recording the ancestry (parent) of a Data Set 22. FIG. 2 also illustrates that there is one Master Set List 30 at each Site.

Figure 3:
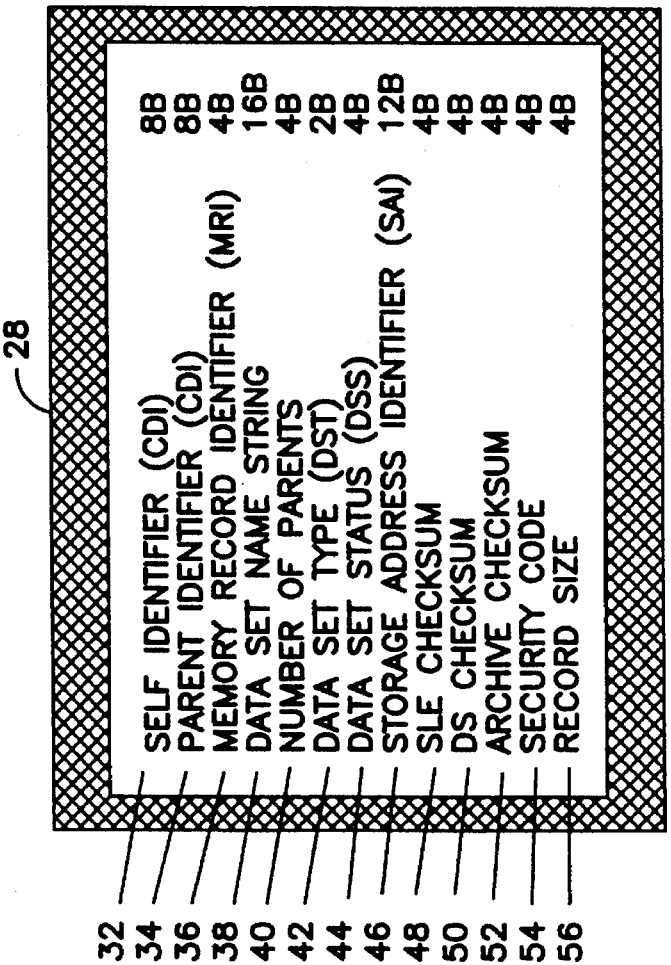
FIG. 3 illustrates the structure of a Set List Element.

FIG. 3 illustrates the structure of a Set List Element (SLE) 28, which is a record within an SL 24. The number of SLEs 28 in an SL 24 is only limited by the amount of memory available. Each SLE 28 within an SL 24 is a Data Set 22 and has fields to control all aspects of its behavior.

An SLE 28 contains all information pertaining to a Data Set 22, including Self Identifier 32, Parent Identifier 34, Memory Record Identifier (MRI) 36, Data Set Name String 38, Number Of Parents 40, Data Set Type (DST) 42, Data Set Status (DSS) 44, Storage Address Identifier (SAI) 46, SLE Checksum 48, Data Set Checksum 50, Archive Checksum 52, Security Code 54, and Record Size 56.

The Self Identifier field 32 provides the identity of the Data Set 22. The Self Identifier field 32 is a key field used for sorting and location activities.

The Parent Identifier field 34 is used to identify a parent SLE 28 within the SL 24 or contains a null. If the Parent Identification field 34 contains a null, then the SLE 28 is a root SLE 28. A root SLE 28 is a Data Set 22 of greatest significance in a given SL 24. An SL 24 can have one or more root SLEs 28. If the Parent Identification field 34 contains a non-null, then the parent SLE 28 is located in the current SL 24.

The Memory Record Identifier (MRI) field 36 identifies where in memory the Data Set 22 is stored.

The Data Set Name String field 38 inside an SLE 28 is the name of the Data Set 22. The Data Set Name String field 38 is primarily for presentation to end-users, although it can be used to locate a Data Set 22 as well.

The Number Of Parents field 40 identifies how many times the Data Set 22 is referenced within other SLs 24 of greater significance. The Number Of Parents field 40 is used only when the Parent Identification field 26 contains a null.

Figure 4:
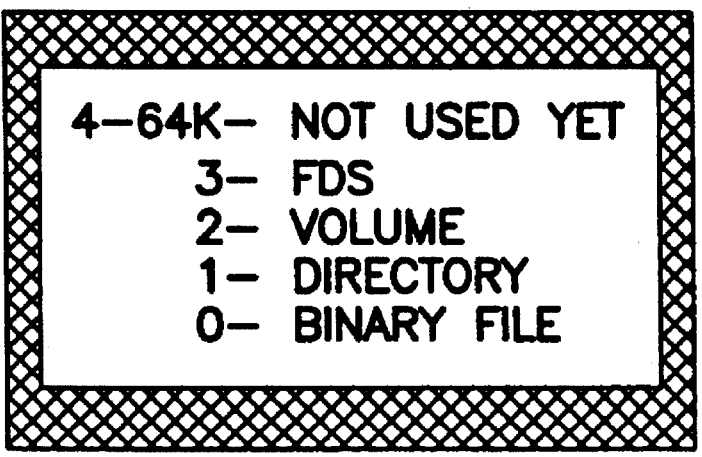
FIG. 4 illustrates the structure of a Data Set Definition Record and the Data Set Types defined therein.

The Data Set Type (DST) field 42 identifies the type of the Data Set 22. FIG. 4 illustrates some example Data Set 22 types and their respective values.

The Data Set Status (DSS) field 44 identifies the status of the Data Set 22.

The SAI field 46 identifies the location in secondary storage of the Data Set 22.

The SLE Checksum field 48, Data Set Checksum field 50 and Archive Checksum field 52 are used for integrity checking at all stages of data movement and storage.

The Security Code field 54 is used to encrypt and decrypt a Data Set 22.

The Record Size field 56 of the SLE 28 to resolve references to records in the Data Set 22.

GENERAL RECORD POINTER

The primary problem with the containment method of storing hierarchy is the difficulty associated with linking data and maintaining the links when the data moves. The solution to the problem is to break the links into two components: a static and dynamic component. The dynamic component is the SL 24, because the SL 24 identifies the location of information within a relative environment. The static component is a General Record Pointer (GRP).

Figure 5:
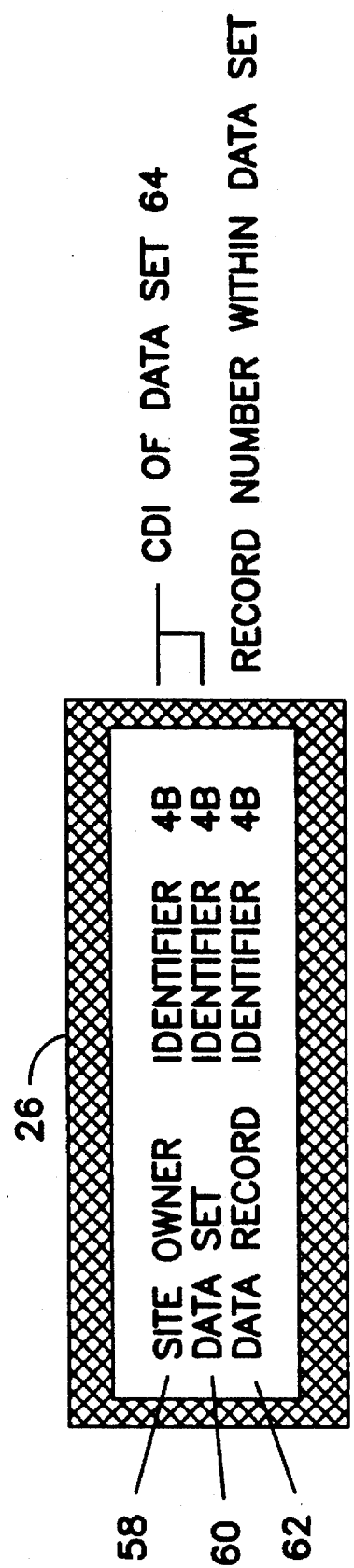
FIG. 5 illustrates the structure of a General Record Pointer.

FIG. 5 illustrates the structure of the GRP 26. The GRP 26 is an 12-byte identifier comprising a 4-byte Site Owner Identifier (SOI) 58 containing a unique identifier associated with the Site, a 4-byte Data Set Identifier (DSI) 60 containing a unique identifier associated with a Data Set 22, and a 4-byte Data Record Identifier (DRI) 62 identifying a record within the Data Set 22.

The GRP 26 is a static component, because a Data Set 22 can move within an SL 24 or be moved to a different SL 24, without affecting the validity of the GRP 26. The GRP 26 remains valid wherever the Data Set 22 moves, because the Data Set 22 has the same identifier as the GRP 26 and need only be matched to the GRP 26.

COMBINED DATA IDENTIFIER

The combination of an SOI 58 and DSI 60 is also termed a Combined Data Identifier (CDI) 64, which is used to uniquely identify a Data Set 22 on any Site. Using the SOI 58 to further qualify the identity of a Data Set 22 allows the Data Set 22 to be moved into and out of various Sites.

For example, Site "A" can import Data Set "1" from Site "B". However, there may already exist Data Set "1" in Site "A". Therefore, the SOI 58 is required to uniquely identify the Data Set as Site "B" and Data Set "1".

In FIG. 2, each of the single and double line links is a CDI 64. The double line links 32 are CDIs 64 which identify the associated Data Set 22 via the Self Identifier field 32. The single line links 34 are CDIs 64 which identify another SLE 28 via the Parent Identification field 34. In this way, the hierarchical structure of a Set List 24 can be maintained in its simplest possible form.

FINITE DATA IDENTIFIER

The combination of an SOI 58 and DSI 60 is also termed a Finite Data Identifier (FDI) 66. The difference between an FDI 66 and a CDI 64 is that an FDI 66 only identifies SLs 24. In contrast, a CDI 64 can identify any class of Data Set 22.

EXTERNAL GENERAL RECORD POINTER

When a Data Set 22 is referenced which is not in the current SL 24, or when the SL 24 is not identified, then a search must be performed to located it. For this reason, an External General Record Pointer (EGRP) is an added convenience to enhance GRP 26 access speed.

Figure 6:
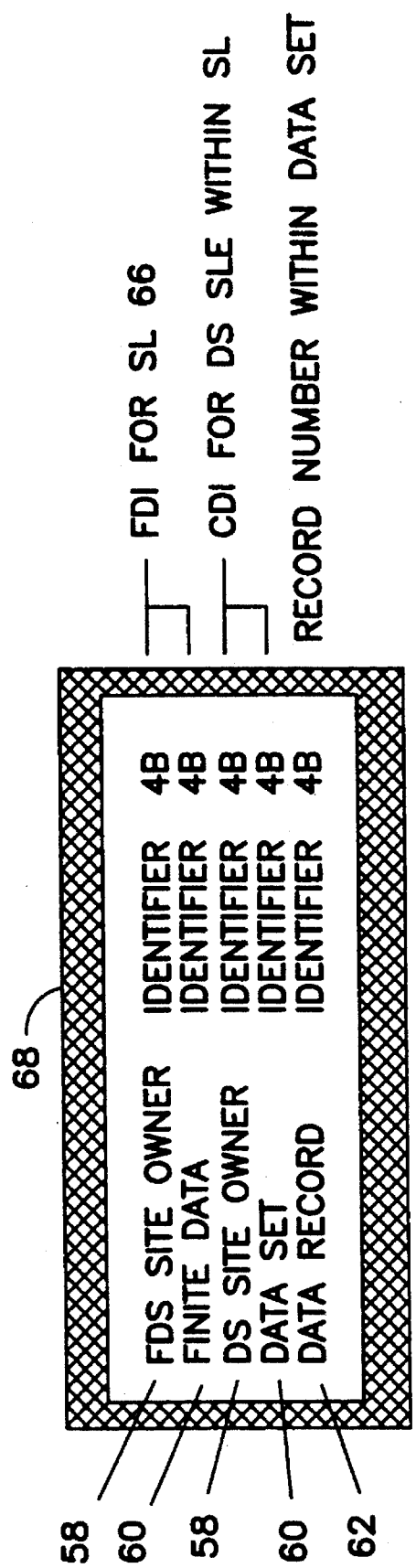
FIG. 6 illustrates the structure of an External General Record Pointer.

FIG. 6 illustrates the structure of the EGRP 68. The EGRP

68 is a 20-byte identifier comprising an 8-byte FDI 66 (including both the SOI 58 and DSI 60 of the desired SL 24) and an 8-byte CDI 64 (including both the SOI 58 and DSI 60 of the desired Data Set 22), and a 4-byte DRI 62. The EGRP 68 identifies a unique Data Set 22 anywhere.

FINITE DATA SETS

Perhaps the most significant of the concepts in the present invention is the Finite Data Set (FDS) concept. An FDS is a logical entity which identifies relative hierarchical structure. An FDS contains internal hierarchical structure, while external links exist which point to that FDS as a subordinate.

An FDS is represented by an SL 24 which may contain internal hierarchy. Further, an FDS may be pointed to as a subordinate by any number of SLEs 28 in other SLs 24. Therefore, an SLE 28 which points to an FDS can occur in more than one SL 24. Therefore, the FDS may be subordinate to any number of (other) SLs 24. This is how an FDS can have multiple parents in a given information structure hierarchy. Occurrences of SLEs 28 which point to the same FDS may reside in a unique and separate SL 24. In this way, an FDS may have any number and class of Data Sets 22 as its ancestors and descendants within the current structure hierarchy.

The FDS methodology varies substantially from conventional containment methodology because an FDS can have more than one parent. The potential plurality of FDS parents is an important concept in the present invention. The potential plurality of an FDS is a feature not possible in environments which operate using the conventional containment method of information structure storage.

When an FDS has more than one parent, the entire Data Set 22 is, in essence, addressable through all references to it. This does not mean the entire FDS is duplicated. Instead, it means the same FDS can be referenced more than once within one or more SLs 24 of greater significance.

FINITE DATA LIST

Figure 7:
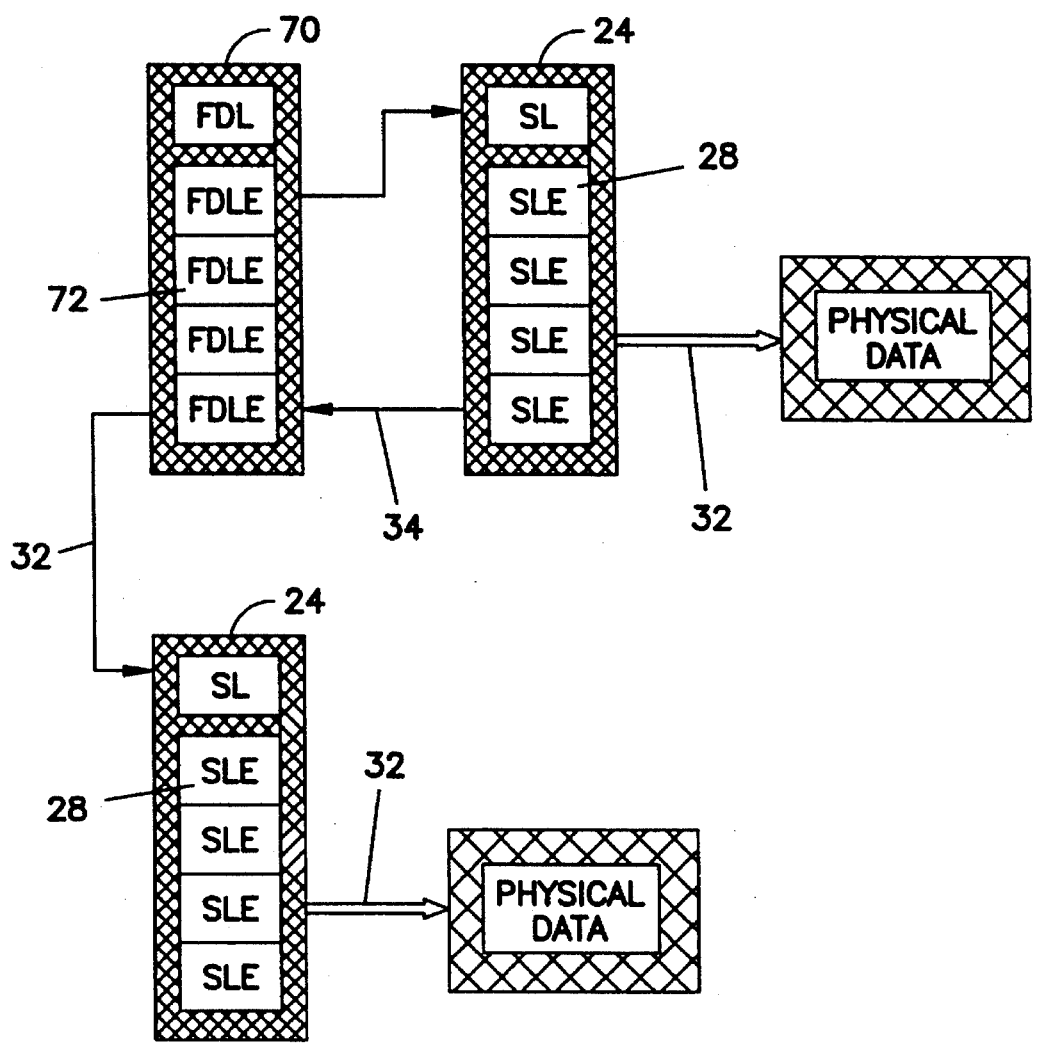
FIG. 7 illustrates the structure of a Finite Data List.

FIG. 7 shows an example Finite Data List (FDL) 70 for a Site. An FDL 70 is an SL 24 which contains a list of records identifying all FDS's at a Site. Preferably, there is only one FDL 70 at a Site. Each FDL Element (FDLE) 72 is an SLE 28 which points to an SL 24.

For example, the SL 24 pointed to by the first FDLE 72 in FIG. 7 contains four SLEs 28. The fourth SLE 28 of the SL 24 represents an FDS. The fourth SLE 28 points to the fourth FDLE 72, which in turn points to another (subordinate) SL 24.

The FDL 70 ignores logical information structure. The FDL 70 physical structure shown in FIG. 7 could also represent an FDS with a logical structure shown in FIGS. 8A and 8B. In fact, the FDL 70 physical structure could be used for any logical hierarchy whatsoever. This illustrates an important property of the present invention—physical structure is made independent of logical structure, thereby supporting any and all logical information structures.

LOCATING DATA SETS WITH THE GRP AND EGRP

A GRP 26 identifies information in terms of: an FDI 66 to identify the SL 24, a CDI 64 to identify a Data Set 22 within the SL 24, and a DRI 62 to identify a record within the Data Set 22. The FDI 66 is not necessary to identify a Data Set 22, because the CDI 64 and DRI 62 can be used alone. However, if an FDI 66 is not provided, then locating a Data Set 22 might require an exhaustive search of all SLs 24 at a given Site for an SLE 28 matching the CDI 64, and potentially at other Sites as well. Therefore, an FDI 66 is a speed saving feature, but is treated as a required component to provide superior data access characteristics.

There are two major sources of an FDI 66: (1) from within the code of an executable program, or (2) as data for that program. When a program provides an FDI 66, data can be assumed to exist within the SL 24 specified by the FDI 66.

The factors which determine the correct GRP 26 format (GRP 26 or EGRP 68) to use, under various conditions, are very straightforward. A GRP 26 is used when a program has a small number of SLs 24 to maintain, and ideally just one SL 24. Data access speed is maximized when a program provides an FDI 66 and all data required for that program exists within the SL 24 specified by that FDI 66.

However, many programs contain or use data which can span several SLs 24. For programs with these data requirements, the EGRP 68 is ideal. An EGRP 68 identifies the correct SL 24, Data Set 22 within that SL 24, and record within the Data Set 22. However, an EGRP 68 is 8 bytes larger than a GRP 26 and should be used sparingly.

Figure 10:
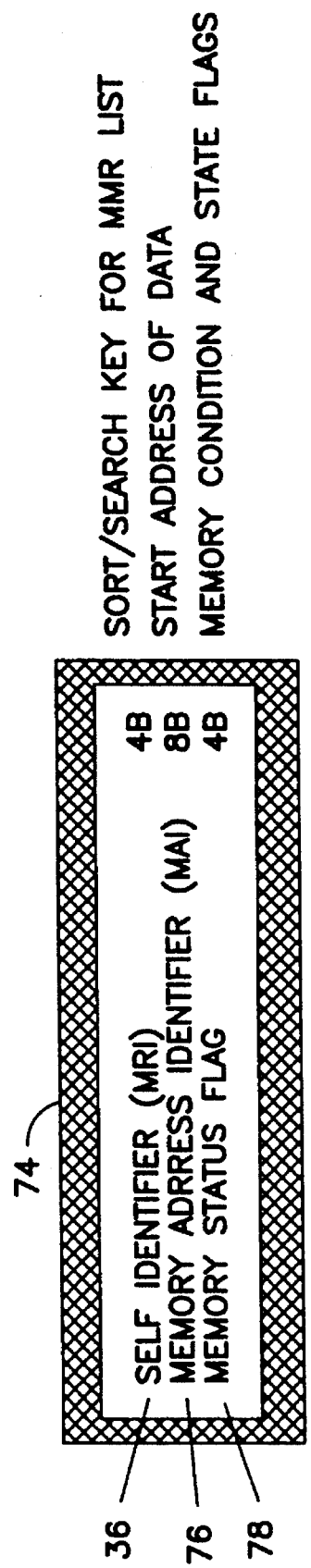
FIG. 10 illustrates the structure of a Memory Maintenance Record.

FIG. 9 depicts the data structures used in the process performed by the FDEP 20 to resolve a GRP 26. The FDI 66 is used as the key to search the FDL 70 for the appropriate FDLE 72, indicated by reference element "(STEP 1)" in FIG. 9. If the FDI 66 does not match any FDLE 72 in the FDL 70, then the FDEP 20 may or may not perform an exhaustive search for the Data Set 22 matching the CDI 64 in all SLs 24. If the FDLE 72 is found, then it will contain an MRI field 36. The MRI field 36 identifies a specific Memory Maintenance Record (MMR) 74, which is illustrated in FIG. 10, and contains a Self Identifier field 36 (an MRI 36), a Memory Address Identifier 76, and Memory Status Flag 78. The MMR 74 contains the address of the Data Set 22 when it is in memory. The MMR 74 resides in the Memory Maintenance List (MML) 80, which is illustrated in FIG. 11. The MML 80 is a contiguous list of MMRs 74 sorted by the MRI field 36. The MMR 74 then identifies a location in memory where that Set List 24 has been loaded.

If the SL 24 has not already been loaded into memory, then the FDLE 72 will contain a null MRI field 36. If the specified SL 24 is not in memory, then it is loaded into memory by the FDEP 20.

The SL 24 is then searched using the CDI 64 as the key, to locate the SLE 28 representing the Data Set 22. This is indicated by reference element "(STEP 2)" in FIG. 9. If the CDI 64 does not match any SLE 28 in the SL 24, then the FDEP 20 may begin searching other SLs 24. If the appropriate SLE 28 is found, then it will contain an MRI field 36.

If the Data Set 22 has not already been loaded into memory, then the SLE 28 will contain a null MRI field 36. If the specified Data Set 22 is not in memory, then it is loaded into memory by the FDEP 20.

The Data Set 22 is then accessed using the DRI 62 as an index to locate a specific record, wherein the DRI 62 is multiplied by the record size given in the SLE 28 to determine the offset into the Data Set 22 when records in a Data Set 22 are stored as an array. The DRI 62 can also be used as a search key when records in a Data Set 22 are stored as a sorted list. This is indicated by reference element "(STEP 3)" 92 in FIG. 9.

Figure 12:
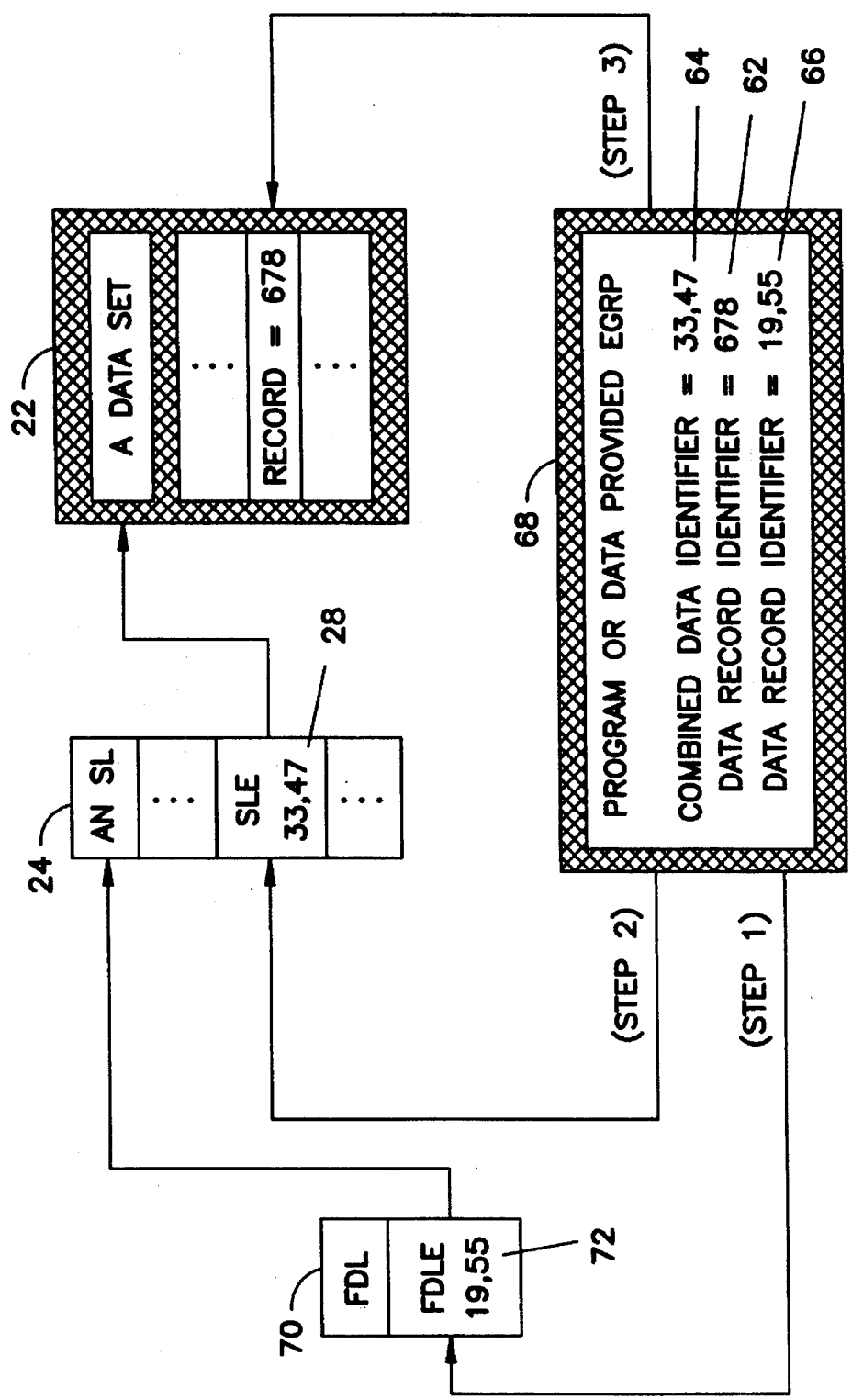
FIG. 12 is a block diagram illustrating the data structures used to resolve an External General Record Pointer.

FIG. 12 illustrates a similar process for an EGRP 68. The only variation between GRP 26 and EGRP 68 resolution is the source of the FDI 66. In the case of a GRP 26, the program provides the FDI 66, and in the case of an EGRP 68, the EGRP 68 provides the FDI 66. These relationships between GRP 26 and EGRP 68 resolution can be seen by comparing FIG. 9 and FIG. 12.

Figure 13:
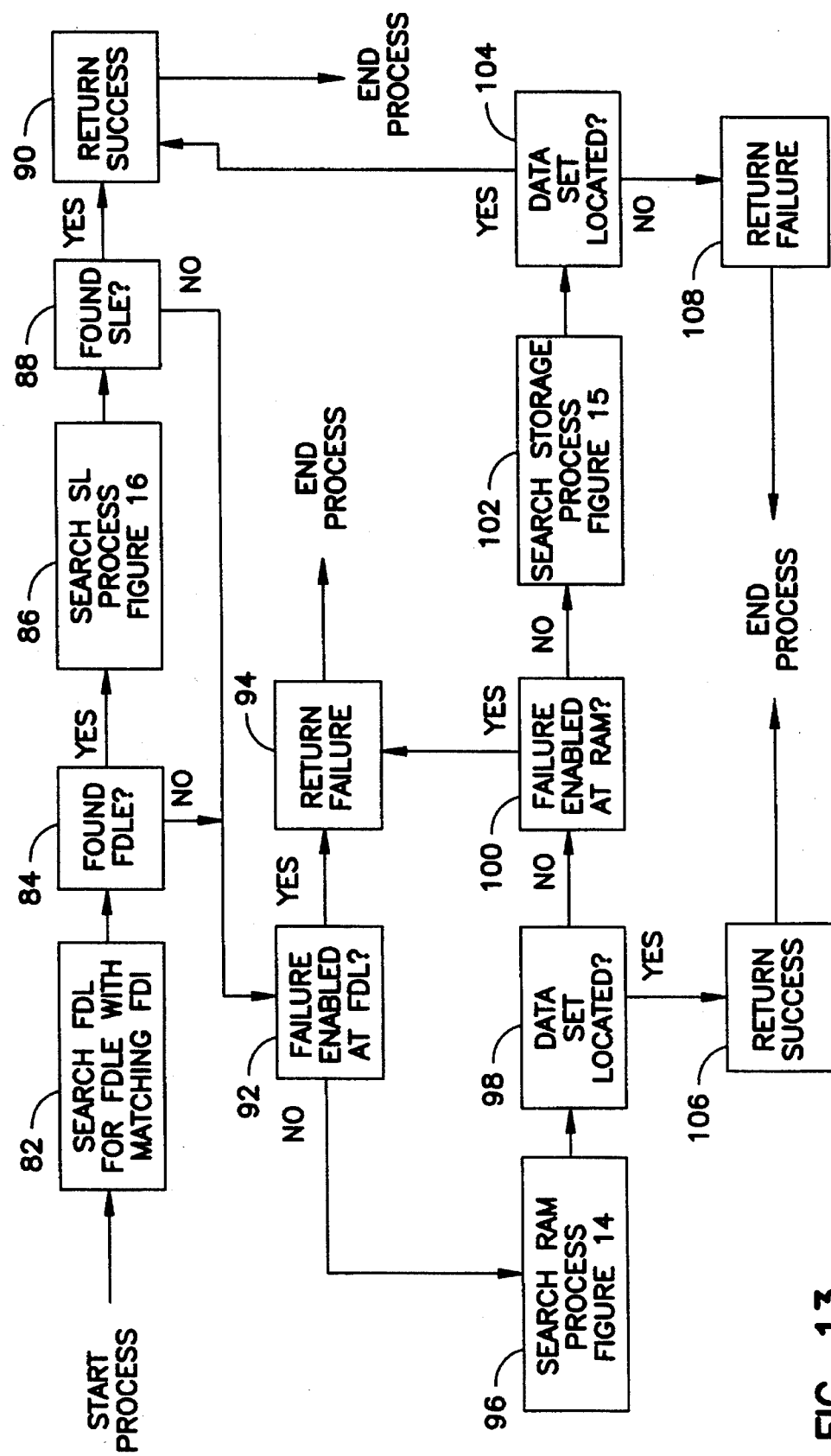
FIG. 13 is a block diagram illustrating the process flow used to resolve a General Record Pointer.
Figure 14:
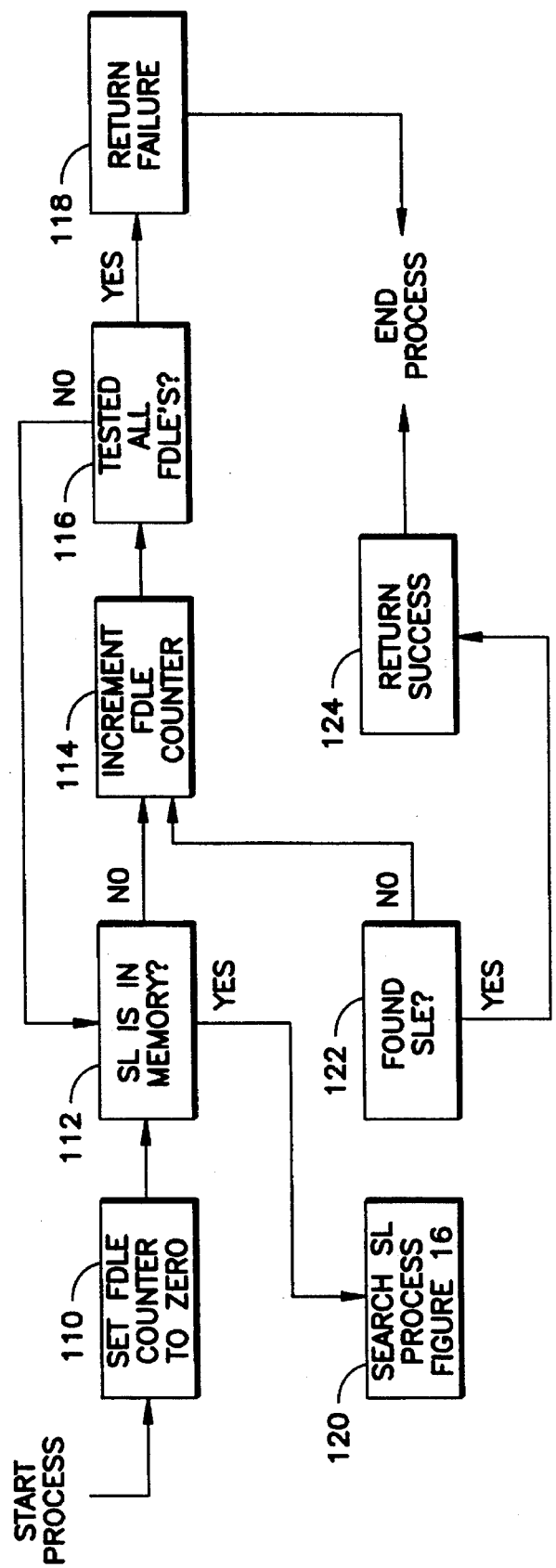
FIG. 14 is a block diagram illustrating the process flow used to search memory when resolving a General Record Pointer.
Figure 15:
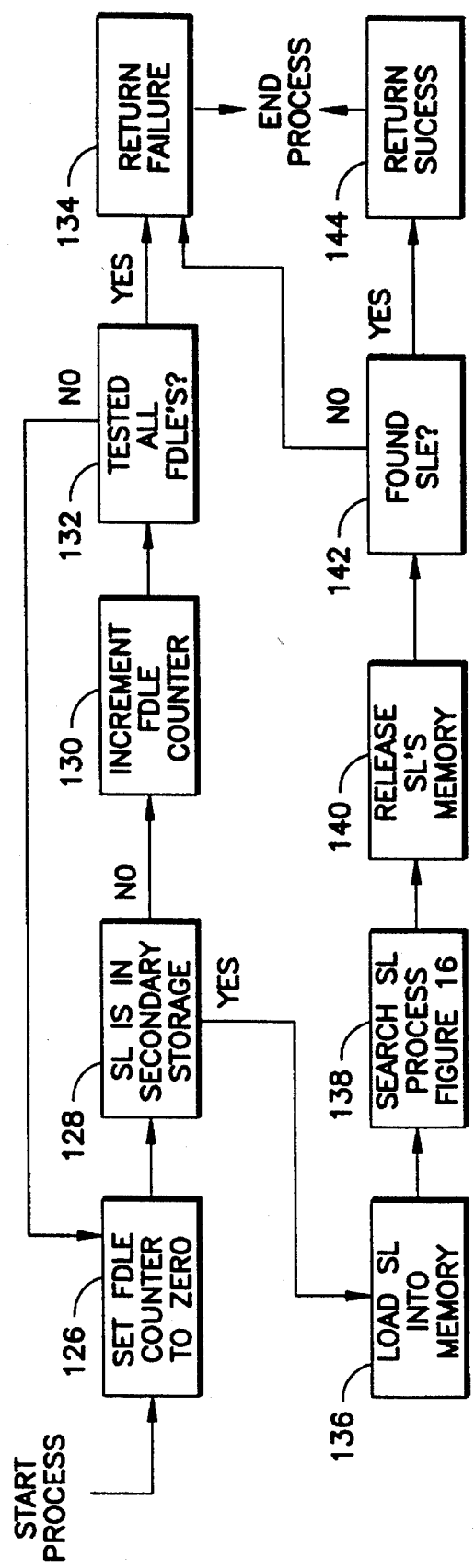
FIG. 15 is a block diagram illustrating the process flow used to search secondary storage when resolving a General Record Pointer.

FIG. 13 is a flow chart illustrating the logic flow of the GRP resolution process. At each step of the process, a search may fail. Each failure may result in further and more comprehensive searches. FIG. 13 is the top-level process diagram and has three boxes 96, 102, and 86, to indicate the various searching processes illustrated in FIGS. 14, 15 and 16.

Figure 16:
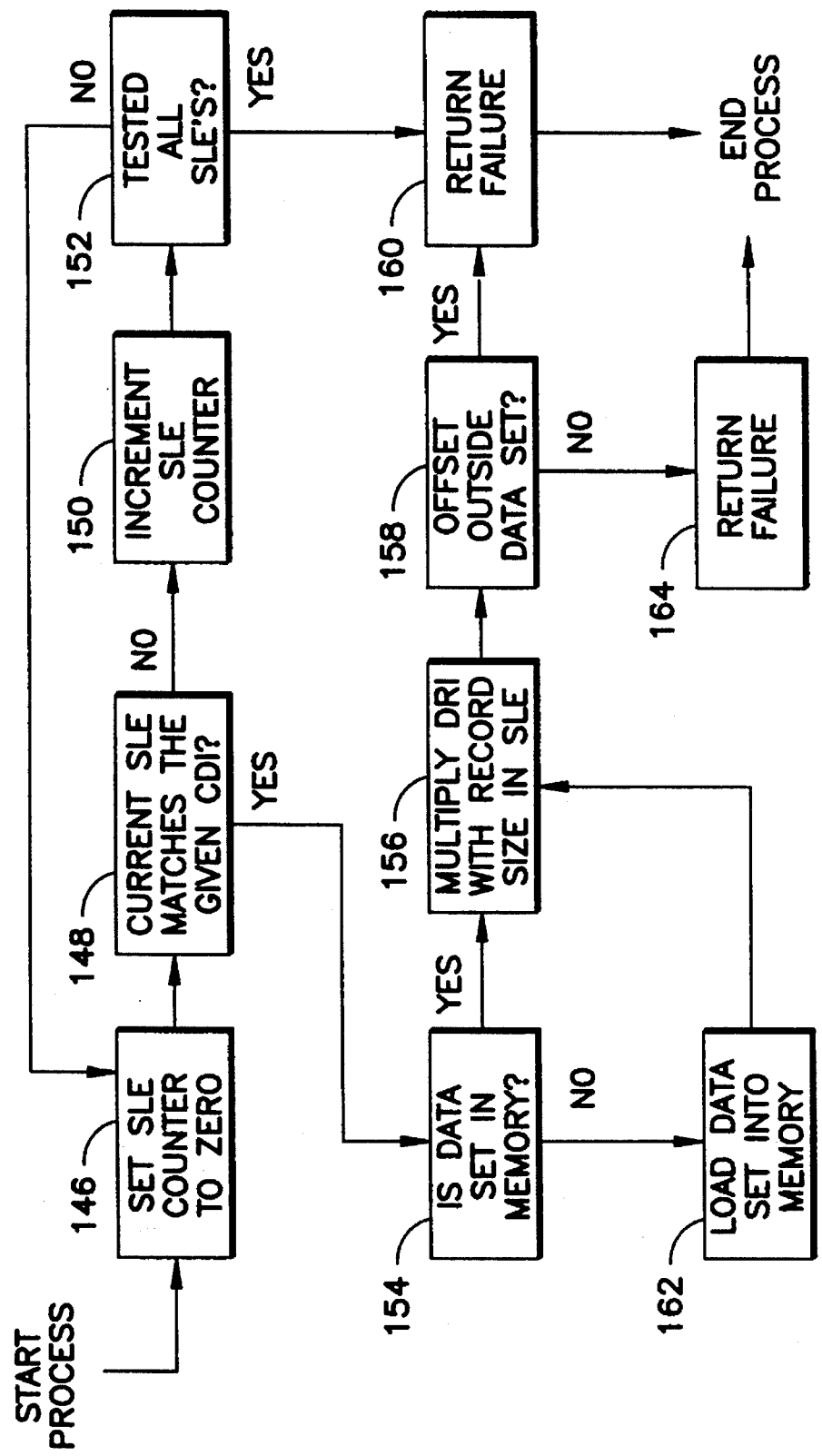
FIG. 16 is a block diagram illustrating the process flow used to search Set Lists when resolving a General Record Pointer.

One purpose of the process depicted in FIG. 13 is to locate data as quickly as possible. To save time, the current SL 24 is always searched first, as indicated by reference elements 96 and 100 in FIG. 13. If that fails, then the next fastest candidates are all the Data Sets 22 (SLs 24) in memory. Searching these SLs 24 is faster than those not yet in memory. This is shown as the search RAM process in FIG. 14. If the RAM search still fails, then the only remaining possibility is secondary storage. This is shown as the search storage process in FIG. 15. Both the RAM and secondary storage processes call the search SL 24 process, to perform a search in an SL 24. The search SL 24 process is shown in FIG. 16. This process searches a given SL 24 for an SLE 28 with a matching CDI 64.

In the present invention, when an SL 24 search for a specified Data Set 22 fails, FDEP 20 will normally take steps to locate the Data Set 22 in other SLs 24. The nature of the search depends on the nature of the user request for data. The FDEP 20 can easily provide several different data location alternatives, including: (1) fail when Data Set 22 is not found in current SL 24; (2) fail when Data Set 22 is not found in any SL 24 currently in memory; and (3) fail when Data Set 22 is not found in any SL 24 at the Site. In selecting the third alternative, the FDEP 20 performs an exhaustive search all SLs 24 to locate the specified Data Set 22.

A failure on an FDLE 72 search is a different matter. Assume a program requests a Data Set "X" within the SL "Y" via an EGRP 68. If the Data Set "X" had been moved to a different SL and the SL "Y" had been deleted, then an FDLE 72 search failure would occur. The failure would occur during the FDLE 72 search because the FDLE 72 for SL "Y" would no longer exist and all SLs are represented in the FDL 70. Therefore, the FDEP 20 would have two alternatives, which are controlled by flags or alternative data request functions. The first alternative is to fail and inform the program the SL "Y" not longer exists. The second is to perform an exhaustive search of all SLs for the Data Set "X".

The GRP 26 resolution process described above assumes that all SLs 24 and Data Sets 22 are mobile in memory. Specifically, the addresses of these entities change depending on memory availability and the requirement of memory optimization. Memory optimization is a process whereby data (SLs 24 and Data Sets 22) are moved around in memory to increase the size of available contiguous memory blocks. When memory optimization occurs, the address of any given data entity can change as a direct result of an optimization.

However, the present invention supports more evolved memory control devices which allow a memory block to be flagged as static. A static memory block is one which will not move during an optimization. When an MMR 74 for an Data Set 22 is marked "static in memory", a program using the present invention can request the address of a Data Set 22 and thereafter directly access that data in memory. This reduces access overhead, but makes memory optimization less efficient.

DATA SET CLASS

All Data Sets 22 may be qualified by a "class". In general terms, the Data Set 22 class defines the storage classification for a Data Set 22: physical, logical, etc. The currently defined Data Set 22 classes are: Containment Data Set (CDS), Physical Data Set (PDS) and Finite Data Set (FDS).

CONTAINMENT DATA SET

A Containment Data Set (CDS) is a class of Data Sets 22 that is a logical entity used to define a conventional hierarchical information structure, such as the drive/directory/file structures of MS-DOS and UNIX. Thus, a CDS is similar to volumes, directories, etc., found in conventional containment methodology.

A CDS has exactly one immediate parent. However, the CDS may logically contain any number of other Data Sets 22 as children. The CDS does not identify its children. Instead, all children identify the CDS as their parent. Further, all the children of a CDS exist in the same SL 24.

A CDS is represented by an SLE 28 within an SL 24. The SAI field 46 of the SLE 28 contains a null value indicating that there is no physical data associated therewith.

PHYSICAL DATA SET

A Physical Data Set (PDS) is a class of Data Set 22 that identifies a physical data entity (e.g., a record, a list). A PDS is used to store actual bytes (or records) of information. A PDS is pointed to by an SLE 28 in an SL 24.

A PDS does not contain any other Data Sets 22 as children. However, a PDS still retains a logical connection by identifying its parent. The parent of a PDS may be a CDS or an FDS.

The location of a PDS is identified by the SAI field 46 of the SLE 28. The SAI field 46 is non-null and typically identifies an address in secondary storage media.

HIERARCHICAL ORGANIZATION RULES (HOR)

There are several rules regarding hierarchical construction in the present invention, these are collectively called Hierarchical Organization Rules (HORs).

The first HOR is the Hierarchical Scope Rule (HSR). The HSR states:

"The priority level of a Data Set must be less than or equal to its parent."

The HSR is a simple rule where each Data Set 22 must have an equal or lower priority number than its immediate parent. As mentioned earlier, each Data Set 22 class is prioritized. The prioritization is independent from the class of data. Thus, all Data Sets 22 will be associated with a unique scalar priority number from 1 to N. Gaps in the priority numbers are possible and even desirable.

The second HOR is the Hierarchical Containment Rule (HCR). The HCR states:

"The absolute path to any Data Set is always a PDS, a CDS, or an FDS, where the CDS or PDS is preceded by zero or more CDS's and/or FDS's".

The HCR is an extension of the HSR which ensures that a PDS will never contain another PDS. For example, a file cannot contain another file. A file is a physical entity (a PDS), and therefore the immediate parent of the file is a CDS or FDS. Although it is possible to have PDS's also act as CDS's, it creates chaos and complicates all FDEP 20 processing.

The third HOR is the Hierarchical Recursion Rule (HRR). The HRR states:

"A Data Set cannot directly or indirectly contain any of its ancestors".

The HRR is required to prevent an endless loop during any FDEP 20 process.

Figures 8A, 8B:
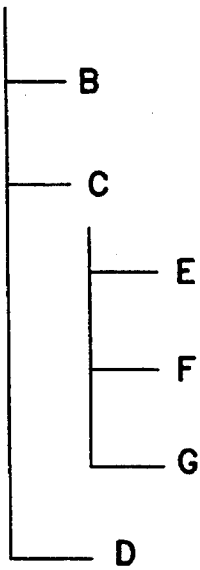
FIGS. 8A and 8B illustrate the structure of a Finite Data Set.

To clarify any misconceptions, consider the absolute path example in FIG. 8A and consider the effects on the FDEP 20 if Data Set "F" is contained Data Set "A". The process would be as indicated in FIG. 17 until "A" is to be resolved. Instead of terminating, the entire process would repeat from Data Set "F" again. The net effect (of any infinite loop) is that the computer would hang. Although it is true that a process could be established to prevent an endless loop or recursion, this same process would have to exist or be called by all programs and processes which traverse a hierarchy. Further, these cyclic hierarchies would introduce unnecessary complications for most users.

FINITE DATA SETS AND THE HOR

FDS's do not obey the HOR. However, when FDS's are introduced into an existing hierarchical structure, they do not disturb and/or affect any other Data Sets 22 which do obey the HOR. When a check is made to ensure a new Data Set 22 conforms to the HOR, any FDS's encountered during the test are processed to establish the next SL 24, but are invisible to HOR testing.

FINITE DATA ENVIRONMENT PROCESSOR

A Finite Data Environment Processor (FDEP) 20 is a process which creates, modifies and maintains FDS's and all structures contained within or related to FDS's. Further, the FDEP 20 also maintains any memory images of SLs 24 or Data Sets 22 requested by a process.

There is exactly one FDEP 20 for a given Site. An FDEP 20 is assumed to have a unique serial number, i.e., the Site Owner Identifier (SOI) 58. Each process using the present invention must access the FDEP 20 to modify the structure and content of information at a Site.

The FDEP 20 is a background process which other processes activate to create, delete or access information, including the following functions:
CREATE DATA SET
DELETE DATA SET
COPY DATA SET
MOVE DATA SET
PROMOTE DATA SET
INSERT DATA SET The FDEP 20 must be a resident process, meaning it must remain in memory while any processes require it. If the FDEP 20 is an operating system, then it will remain in memory until the computer is powered down. If the FDEP 20 is a resident driver for a program, then it will have to remain in memory as long as the program remains in memory. Further, the FDEP 20 must have the ability to allocate memory and utilize physical storage devices. Finally, the FDEP 20 should have complete access to all information that may be requested or used through it. The FDEP 20 can exist and operate within a conventional containment-style operating system, although it will operate at processing speeds normally associated with that operating system.

Data movement can occur at many processing levels and can involve anything from moving a single record to moving an entire Data Set 22. In most cases, the movement of data less than a Data Set 22 is the responsibility of the program using the data. Therefore, this aspect of data movement is covered in the section entitled "Information Structure." The movement of Data Sets 22 can be experienced at any processing level and is the primary focus of this section.

One of the cornerstones of the present invention is the simplicity of redefining relationships between Data Sets 22. A Data Set 22 is moved by altering the Parent Identifier field 34 of an FDLE 72 or SLE 28. Thus, Data Set 22 movement is always performed in terms of the parent of a target location. Further, any entities logically contained within the Data Set 22 being moved are also transported, without actually modifying their SLEs 28 in any way. All containment-style operating systems performing the same activity would have to load, update and save, potentially large variable length child lists. For example, the File Allocation Table (FAT) in MS-DOS is used to access and locate the files in a directory. When a file is moved, two FATs have to be updated, the old parent directory and the new parent directory.

There are currently four fundamental classes of Data Set 22 movement: create, delete, copy and relocate. Copy and delete functions can be implemented as singular functions where there is only one kind of Data Set 22 copy and one kind of delete. This is not true for relocation operations. When a Data Set 22 is relocated, several distinct operations are possible. Relocation can include operations such as: move, promote, and insert. Although all of these operations involve the movement of one or more Data Sets 22, they have different logical characteristics. For example, the promote function, would locate the parent of the current parent and reset the Parent Identifier field 34 of the current Data Set 22. The location of a parent's parent is a logical activity because both the old and new parents can exist in the same SL 24.

In all the following Data Set 22 operation explanations, the name, type and other Data Set 22 information not directly related to linking is assumed to be input. When EGRP 68 is specified as a required input, this means it can also absorb a GRP 26 and a parent CDI 64 provided by the program. Each operation performs HOR testing to ensure the validity of all hierarchical modifications. HOR testing is performed on each entity modified, including subordinate Data Sets 22 when they are modified. If a subordinate is not modified, then HOR testing is not necessary. Note that all of the operations described below must be re-entrant.

CREATE DATA SET

The "create" operation introduces a new Data Set 22 into a Site. The create operation requires exactly one input: an EGRP 68 to identify the target parent for the new Data Set 22. The create operation is so straightforward that a diagram is not required. However, it is necessary to point out that when data is imported from other Sites, the create function, is not directly used to establish new Data Sets 22. When one or more Data Sets 22 are imported from another Site, they are assumed to already exist. Therefore, one of the RELOCATE class operations would be used. The RELOCATE class operations may in turn invoke the create operation, but the process which triggered the FDEP 20 to activate a RELOCATE class operation would not. If another Site is specifically creating a new Data Set 22 at the current Site, then the create operation would be used.

DELETE DATA DELETE

The "delete" operation deletes a Data Set 22 and all subordinates from a Site. The delete operation requires exactly one input: an EGRP 68 of the Data Set 22 to delete. The delete operation is so straightforward that a diagram is not required. However, it is necessary to point out that when data is moved to a different Site, using one of the RELOCATE class of operations, the delete command is not directly used. The RELOCATE class operation may call it, but the process which triggered the FDEP 20 to activate this function would not. Note that the delete operation does not physically delete FDLEs 72 or SLEs 28, it simply marks them as deleted. This is common to almost all data maintenance systems.

COPY DATA SET

A Data Set 22 can be duplicated via the "copy" operation. When a Data Set 22 is copied, a new Data Set 22 is created. The new Data Set 22 is exactly the same in terms of data content and control linking. However, the new Data Set 22 is assigned a new and unique Self Identifier field 32 (which is a CDI 64). Note that the change in the Self Identifier field 32 is critical to the present invention, because every Data Set 22 must have a unique Self Identifier field 32.

After a successful copy, space consumption is doubled because an exact copy of the Data Set 22 is added to the existing Site. FIG. 18 depicts a simple copy operation. Data Set "F" is being copied directly under Data Set "A". After the operation a new Data Set "H" will be an exact duplicate of Data Set "F".

FIG. 19 depicts a copy operation which includes subordinate hierarchy. In this operation, the subordinate Data Sets 22 are also duplicated and each will also have a new Self Identifier field 32. Further, the Parent Identifier field 34 of the subordinate Data Sets 22 identifies the new parent. In FIG. 19, Data Sets "I", "J", "K" are identical to Data Sets "E", "F" and "G", respectively, but "I", "J" and "K" all have a parent of "H".

The copy operation performs a test to establish if other Data Sets 22 are immediately subordinate to the Data Set 22 being copied. When a subordinate is located, the Data Set 22 copy is also performed on it. This process can be recursive or iterative. When a copy is performed on a root Data Set 22, it can be used to transfer entire volumes of information to another storage media, or to duplicate that information in the same media. Under all conditions the original Data Set 22 remains unchanged.

MOVE DATA SET

The "move" operation moves a Data Set 22, and all subordinates, from one location to another within a single SL 24 or to a different SL 24. FIG. 20 depicts Data Set "E" being moved from a parent of "C" to a parent of "B". None of the subordinate Data Sets 22 are changed in any way during a move operation. The Parent Identifier field 34 in each SLE 28 still identifies the same parent. However, all subordinates are logically promoted in terms of future references.

PROMOTE DATA SET

The "promote" operation moves a Data Set 22 to the same level as its current parent. This is similar to the move operation, except the only input for this function is an EGRP 68 for the source Data Set 22. The promote operation uses the Parent identifier field 34 of the source Data Set 22 to locate the target location.

Figure 21:
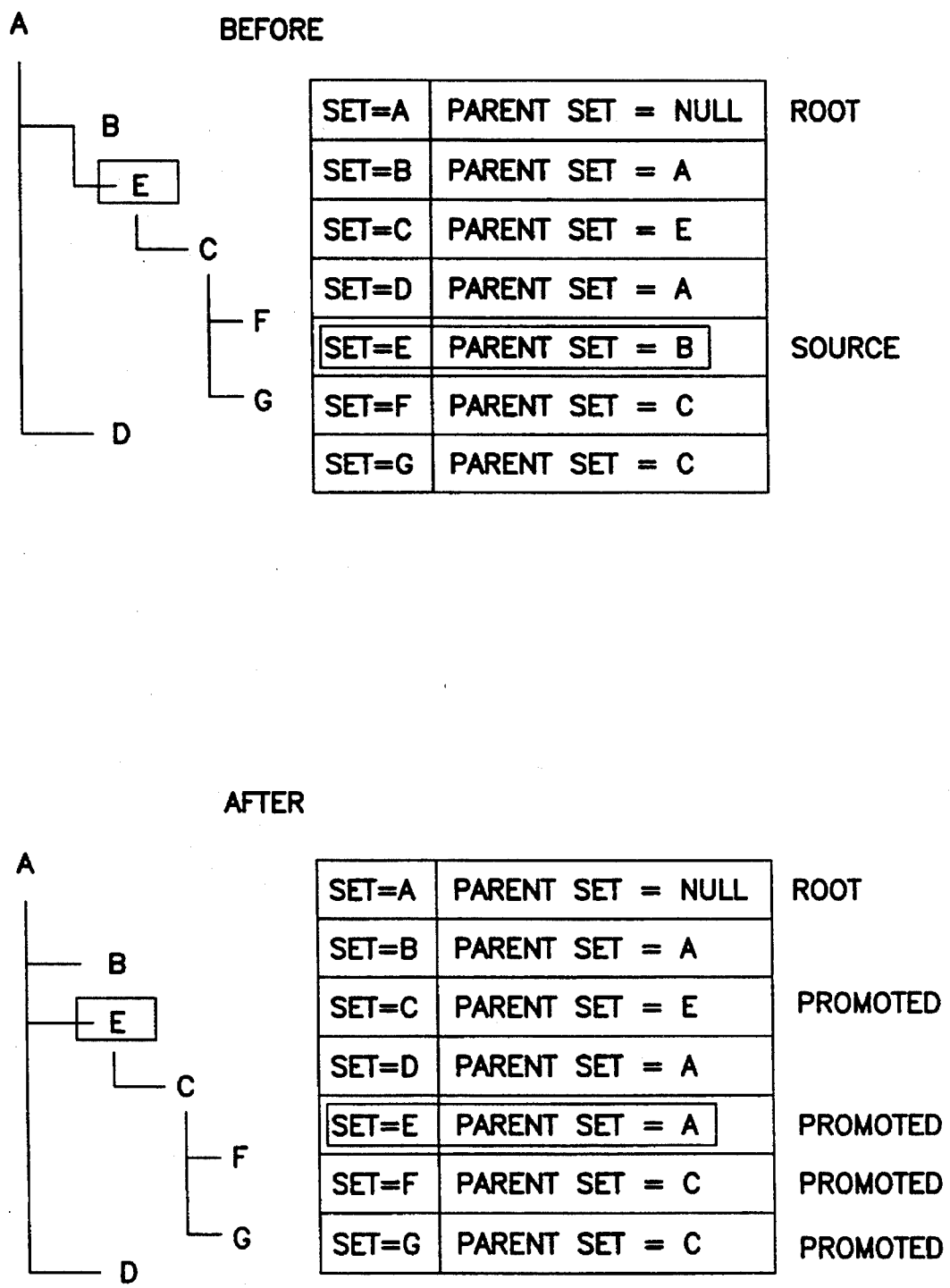
FIG. 21 illustrates the results of a Data Set promote operation.

FIG. 21 depicts Data Set "E" and its subordinates being promoted. None of the subordinate Data Sets 22 are changed in any way during a promote operation. The Parent Identifier field 34 in each SLE 28 still identifies the same parent. However, all subordinates are logically promoted in terms of future references.

INSERT DATA SET

The "insert" operation inserts a Data Set 22 between an existing Data Set 22 and its parent. This demotes all subordinate Data Sets 22, but does not modify any of the control records for these Data Sets 22. In essence, the insert operation creates a new Data Set 22 and changes the Parent Identifier field 34 of the target Data Set 22 to that of the newly created Data Set 22.

Figure 22:
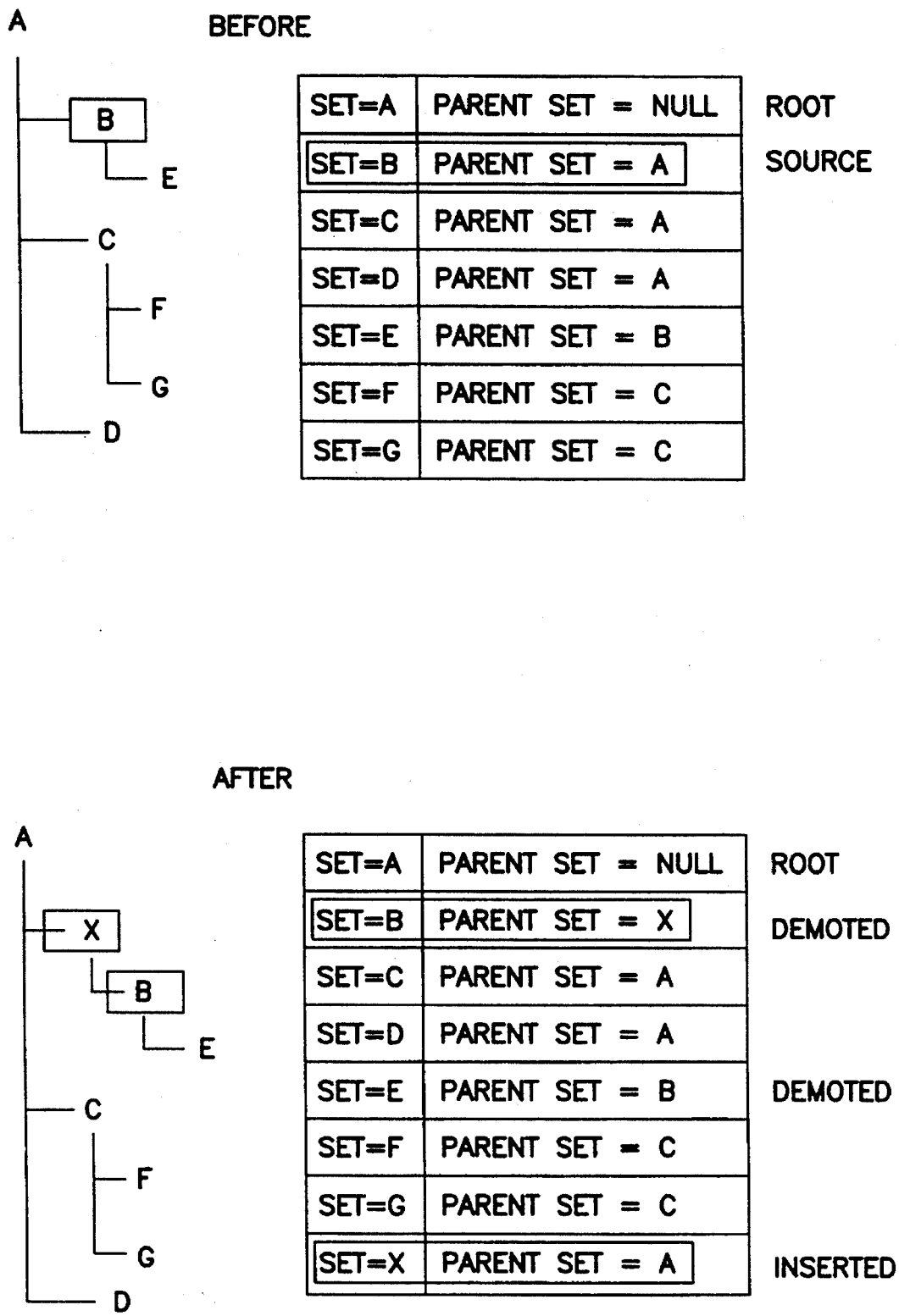
FIG. 22 illustrates the results of a first Data Set insertion operation.

FIG. 22 depicts a Data Set "X" being inserted in front of Data Set "B". The new Data Set "X" absorbs the Parent Identifier field 34 of Data Set "B" and creates "X" as a child of "A". The Data Set "B" is modified to have a parent of "X". The input for this example of insert is an EGRP 68 for Data Set "B".

The same logic applies when a Data Set 22 is to be inserted in front of a root Data Set 22, as shown in FIG. 23. The only thing to note is that the Parent Identifier field 34 of Data Set "A" is null. Thus, the parent of Data Set "Y" is null after the insert operation is complete.

INFORMATION STRUCTURE

A Data Set 22 is a logical and physical information structure. However, a Data Set 22 is also a data entity because it can be created, moved, duplicated, deleted, linked, or changed for content. In general, information structure is affected by a multitude of requirements and restrictions. The issues pertaining to the present invention are discussed in the following paragraphs.

When any information structure is moved, the presence of information references to data outside the structure must be considered. If the structure is totally self contained, meaning there are no references to data outside the structure, then it can be moved without incident. However, an information structure which contains references to data not contained within the same structure, may have restrictions regarding where the structure can be moved. Further, references to external data may have spacial dependencies which prohibit data movement outside of a defined scope. When data movement is limited in this way, there were previously only three solutions, prior to the present invention. First, do not move the data outside of the defined scope. Second, also move the data related to the external references. Third, make sure the data related to the external references exists at the target location. The present invention solves this problem by retaining the validity of all data links, even after the data has moved.

Different developers may use different schemes of information structure to represent data, where the data may or may not be of the same kind. Also, the same developer often uses different information structure schemes to represent different and general classifications of data. Any system that uses more than one database faces the possibility that the databases are completely different in structure. For example, a system that provides both accounting and task management could be faced with a relational, as well as a hierarchical database. The processing requirements of these two database types are different, which means the system contains particular logic (code) for both database types. In other words, the system must be aware of the database type and take conscious steps to retrieve data according to that type. The present invention directly supports all containment (e.g., hierarchical database, directory-file) as well as non-containment (e.g., relational database, network database) logical organizations. The present invention enables all logical organizations directly because each GRP 26 is a DIRECT link to data, no matter what logical organization is present and no matter where that GRP 26 occurs in that logical organization. By adding new Data Set 22 Types to the existing set, the system developer can introduce and use new logical organizations. This would inform both the system (program) and the FDEP 20 when that data is accessed in the future, but would not alter GRP 26 processing by the FDEP 20 or access by the program. In this way, the number of potential information structures (or logical organizations) directly supported by the present invention is virtually unlimited. Where containment methodology is highly limited and requires special processes to control more complex information structures.

The direct linking capability of the present invention enables direct linking of incongruent data structures. For example, a binary tree where each node is also an element of a linked list. The record can directly identify next and previous elements, as well as the left and right nodes (in the tree). The system would still contain the logic to traverse the tree as well as the linked-list. However, the code required to get (locate, load, return address) a node in the tree would be identical to get an element of the linked list. Further, the processing performed by the FDEP 20 to locate, load and return the address, would also be identical. The same would be true for data structures of any complexity with any number of compound links, where a compound link is a field in a record capable of identifying at least two distinct and different information bodies. For example, a binary tree whose every node identifies either the root of another tree or the head of a linked list. To identify the secondary tree or the list, the same GRP 26 field, in the node's record, can be used. This is possible because relationships to data can be duplicated (several GRPs pointing at same data) while any one GRP 26 field in a record can point at any data regardless of that data's logical organization.

Cyclic information patterns can be accurately represented. For example, a linked list which is linked to another linked list in a three dimensional model, but cycles back on one or more of the dimensions.

When using the present invention, the program designer must be aware of the specific and overall differences between GRP 26 and EGRP 68 usage. Physically, when GRPs 26 are used as data links (or pointers), the overall and individual size of data is less than when EGRPs 68 are used. This is a superficial difference and should not be used as a sole deciding factor between the two methods. First, the designer must decide what the general relationship between his program and its data are. This can be expressed as either the program "drives" the data, or the data "drives" the program. In the first case, the program consciously directs the steps to locate, retrieve, and maintain the data. In the second, the program accesses data by referencing its identifier without taking any conscious steps to otherwise identify that data. When GRPs 26 are used, the program is driving the data. This could be done by a program when it saves the parent FDI 66 of the currently requested Data Set 22, and supplies it to the FDEP 20 on each subsequent GRP 26 request. Note that the program is not required to save this information; it is optionally saved to reduce GRP 26 processing overhead. On the other hand, when EGRPs 68 are used, the data "drives" the program. The program simply passes the identifier (the EGRP 68) to the FDEP 20. The parent FDI 66 is already inside the EGRP 68. So, the same ends as saving the parent by a program are achieved without the program even knowing about this information or its related processing. Another advantage of EGRPs 68 is that a program can access a completely alien piece of data without any special knowledge. The data may be on another Site and of a form not known to the program accessing that data. Using EGRPs 68, this is not a problem because all information about the data (and how to retrieve it) is already contained in the associated SLE 28. This enables the FDEP 20 to properly retrieve that data without program interference, pre-knowledge or specialized code.

THE PATH CONCEPT

The present invention eliminates the need for paths for identifying the location of data. However, in some instances the construction of an absolute path is necessary for end-users. Unlike a program, end users may not understand GRP 26. Therefore, they may be presented with names (text) to identify the Data Sets 22.

In the present invention, path construction can occur from two directions: top-down and bottom-up. Top-down means all descendants of a given Data Set 22 are traversed (and recorded on demand). Bottom-up occurs when ancestors of a given Data Set 22 are traversed (and recorded). The current Data Set 22 must be supplied to both path traversal processes to identify the start of traversal. This can be passed as a GRP 26, EGRP 68, or FDI 66. For simplicity, the rest of this document only mentions FDIs 66 when referring to process input(s). Note that FDI 66 is the smallest number of input bytes (or parameters) to perform exactly the same processes.

In top-down, all descendants of an initial Data Set 22 must be found and accumulated. This traversal is dependant on the class of the Data Set 22. If the initially supplied Data Set 22 is of class PDS, then the process successfully terminates because a PDS cannot have any descendants. If the initially supplied Data Set 22 is a CDS or FDS, then the process continues in a recursive manner.

This process is shown in as the method "TOP_DOWN" in Table I. If a CDS is encountered in traversal, then the current SL 24 is searched for all SLEs 28 whose parent is the given CDS. Once all these Data Sets 22 have been located, the process recurses on each of these Data Sets 22 to determine their descendants.

If an FDS is encountered in traversal, then the SL 24 is searched for all root SLEs 28 as indicated by a null Parent Identifier field 34. The root SLEs 28 are the immediate children of the FDS, and again the process recurses on each one.

At each recursive level, a PDS class causes the successful termination of that recursive call. The process terminates when all descendants have been found (i.e., all recursion levels are terminated).

Also, as shown in Table I, the step "DISPLAY OR

ACCUMULATE NAME OF CURRENT_DS" is performed for all Data Set 22 classes. Depending on the purpose of a top-down function, the Data Set 22 names could be immediately displayed or accumulated in a structure for later use. If accumulated, then the output from a top-down process is large, even if only names were recorded at each step. This process is useful when operating system shell programs (e.g., Norton Commander, MS-DOS 5.0, etc.) need to display and process information in secondary storage (and memory) according to a hierarchy.

In top-down traversals, FDS's with multiple parents do not effect processing because the direction of traversal makes the process unaware of (blind to) parent links altogether.

In bottom-up, the ancestors of a given Data Set 22 must be traversed, until a root SLE 28 in the MSL 30 is reached. This establishes the absolute path to the Data Set 22. The input FDI 66 locates an SLE 28 within the current SL 24, which has a parent. The SLE 28 for the parent is then searched for and located. The parent SLE 28 may be in the same SL 24 or it may exist in another SL 24. In this way, traversal encompasses internal as well as external SL 24 processing. This process continues until a true root (the root SLE 28 in the MSL 30) is encountered. At that time, the fully qualified path has been established by concatenating the Data Set Name String field 38 of the SLEs 28 at each step of traversal. Note that the concatenation at each step is performed at the head of the current accumulated textual string. At each step, the current name is concatenated with the existing accumulated textual string. The current name string becomes the accumulated string for the next step of the process.

The construction of an absolute path in the bottom-up direction can present a problem when an FDS with more than one parent is encountered. The construction of an absolute path is only a problem if an FDS chain has not been established. An FDS chain is a hierarchical set of FDS ancestors for a CDS and FDS, which lead to a current FDS.

An example of this is a user traversing through the hierarchy of several FDS's to reach a desired or target FDS. Each FDS traversal is recorded and constitutes part of the FDS chain. When an absolute path is required, the current or target FDS would use the FDS's identified in the chain as parents.

Note that FDS chain methodology is only necessary when an occurrence of an FDS with more than one parent is encountered. FDS chain methodology does not affect GRP 26 resolution in any way because a root SLE 28 of class (PDS or FDS) in the current FDS contains all information required to resolve the reference.

Note also that the bottom-up process to construct a path only occurs when a user consciously requests a path string. This process has no effect on critical GRP 26 processing.

NAMING CONVENTIONS

In existing systems, names for data (and/or paths) are always strings, where a string is a sequence of characters. String formats in current industry range from just a terminator, to complicated control areas at start of (or before) the string. In most prior art, data is located by using the name. This makes data access dependant on strings. Witness to this fact are the large number of patents held by IBM, APPLE, etc., that provide new and efficient ways of string processing. To these developers, strings are not a convenience, they are an integral and crucial part of data location, access, and maintenance. While efficient string processing algorithms are extremely useful for word processing and formatting applications, they are not efficient when data access and location are considered. The problem is not the algorithms, it is that string processing will always be slower than a process which uses binary identifiers. Further, if strings are used as identifiers, then they must be stored in RAM by any program using the data, as well as stored in any data record which wants to point to another piece of data. This makes the memory required for a program and the size of data records much larger. This increase is further complicated by the fact that in most instances, the name strings are variable length. Ultimately, strings used as data identifiers are always bulky and awkward to maintain and process.

The present invention enables a Data Set 22 to be uniquely identified (across any number of Sites) via a GRP 26. As a result, no string processing is ever required. For the present invention, names are a convenience for the user's sake. A program or user adopting the present invention may still use strings as identifiers, but processing overhead will be greater than a strict GRP 26 or EGRP 68 access. Locating a Data Set 22 by its name is generally the same process as GRP 26 resolution, except the Data Set Name String field 38 is used as the key instead of the Self identifier field 32. The increase in processing overhead is substantial because a string comparison is notably slower than a binary number comparison.

However, a program which presents data to a user on a strictly name basis may encounter problems. When such a program locates the first SLE 28 (or FDLE 72) with a matching name, it would stop and assume it has found the correct data. However, this is an incorrect assumption for two reasons. First, a single directory may contain multiple occurrences of data with the same name. Second, an SL 24 can contain multiple occurrences of data with the same name, but located in different directories. Recall, an SL 24 is a list. Therefore, a direct search would yield an occurrence of data with that name, not necessarily the correct occurrence or even the correct directory. Note that a program or FDEP 20 can prevent name duplication at specific levels in an SL 24 or FDL 70 hierarchy, Thus, eliminating this problem. The FDEP 20 can accomplished this by setting a flag in the FDLE 72 to prevent name duplication. A program can prevent name duplication when required by searching for that name before saving data to secondary storage. A program can hierarchically order information such that name oriented conflicts are prevented and a different area in the hierarchy can still have several bodies of data with the same name. Information ordering, method of access and resultant problems are a direct responsibility of the program using the data. The FDEP 20 does not perform any program specific logic. This is not a limitation of the present invention, it is a reality of computing; a program does exactly what you tell it to do, whether it is what you wanted or not.

Problems related to having multiple occurrences of data with the same name is an old problem and is found in all digital computing environments, which identify data by name. For instance, UNIX, MS-DOS, OS/2 and WINDOWS use the concepts of CURRENT WORKING DIRECTORY and SEARCH PATH. Assume a file "FRED.XXX" exists in the CURRENT WORKING DIRECTORY and one or more of the directories identified in the SEARCH PATH. Further assume that ".XXX" is an extension which will cause the search path to be used. Under these conditions the copy of "FRED.XXX" in the CURRENT WORKING DIRECTORY would execute. However, if "FRED.XXX" does not exist in the CURRENT WORKING DIRECTORY, then the first occurrence encountered in the search path would be executed. Note that the operating system would execute the first occurrence, not necessarily the correct one. Therefore, the problems associated with having multiple files with the same name is common to all operating systems, which identify data by name. Also note that if "FRED.XXX" was not found in the CURRENT WORKING DIRECTORY or in the SEARCH PATH, then the operating system will return an error, normally as "FILE NOT FOUND".

The present invention has the ability to support the concepts of CURRENT WORKING DIRECTORY and SEARCH PATH, but they are accomplished differently. In the present invention the concept of CURRENT WORKING DIRECTORY can be accomplished at the SL 24 or directory level, by limiting SL 24 searching to those Data Sets 22 with a specified parent CDI 64. The same is accomplished in an SL 24 by limiting a search to a specific SL 24. However, under normal conditions the present invention goes beyond the limitations imposed by the use of CURRENT WORKING DIRECTORY or SEARCH PATH, to enable a feasible search of all available storage media to locate a requested entity. In this case, "feasible" means such a search is possible in less time than the average program is willing to wait for data. Clearly, this search is generally only "feasible" when the present invention is used (i.e., GRPs 26, not name strings).

In any valid data linking methodology, a non-unique identifier can only occur once at any given level in an information hierarchy. When data is identified by name, two entities may not have the same name at the same position in the hierarchy. For example, in MS-DOS or UNIX, if the file FRED.XXX is in the directory ALICE, then no other file in that directory can be called FRED.XXX.

However, in the present invention it is possible for two or more entities to have the same name, since the name is not the key used to identify data. Rather, the GRP 26 is. This property of the present invention may seem alien, but it does have an additional benefit.

Assume that two files called FRED.XXX are created by two separate users in two different directory areas. In the prior art, if one of the files is copied to the other's directory area, then the target file will be overwritten. This is common in networks, mini and mainframe computers, especially when more than one user is working in the same directory.

This problem can be easily avoided in the present invention. Even if the supplied identifier was a name string, eventually an SLE 28 will be found (if data exists). The SLE 28 contains the Self Identifier field 32 which is a CDI 64 uniquely identifying the Data Set 22. If the CDI 64 of the located Data Set 22 and the target Data Set 22 are not the same, then no overwrite occurs, and a new Data Set 22 with the same name is created. In this way, accidents as a result of different users using the same name are almost impossible in the present invention.

The present invention has the ability to maintain several files with the same name, which contain different data or different versions of the same data. For example, a program may edit a given body of data and the user can have the option of saving that data on an arbitrary basis. If the program stores each copy of the data as a discrete Data Set 22, with the same name, then the user can access previous versions of that data with a minimum of effort. In essence the ability to maintain several versions of data with the same name supports or gives rise to a very powerful UNDO capability.

DATA TRANSIENCE

Using SLs 24, the present invention permits contiguous hierarchical structures to exist across one or more physical storage devices. An SL 24 may or may not be on the same physical storage device as the information it represents. Further, each SLE 28 within an SL 24 can identify information existing on different physical storage devices. The principle is to allow structure information and physical data to be mobile while keeping all links valid.

The capability of a Data Set 22 (or SL 24) to encompass more than one physical device, has many direct applications. Consider a standalone computer which contains the following I/O devices: Floppy, Hard-drive, CD-ROM drive, Floptical, Tape-drive, ROM, RAM. Normally, a separate device driver would have to be used for each device.

Further, to transfer data between the devices, often several systems (programs) are required. Using SLs 24, all such drivers and low-level systems are centralized through a unique driver, namely the FDEP 20. The present invention accomplishes this centralization while reducing the access overhead and simplifying the memory maintenance duties of the FDEP 20.

REMOVABLE STORAGE MEDIA

Removable Storage Media (RSM) refers to a combination of one receptacle (or disk drive) and a potentially large number of storage disks (e.g., floppy, tape-drive, removable hard-drive, etc). Currently many ways of having one logical data entity across multiple RSM disks exist. All such techniques are particular to the specific needs of a single program (or group of programs). As a result, the transfer of data between various RSM is cumbersome and complicated. In the present invention, part or all of a Data Set 22 can be defined to be an RSM.

Figure 24:
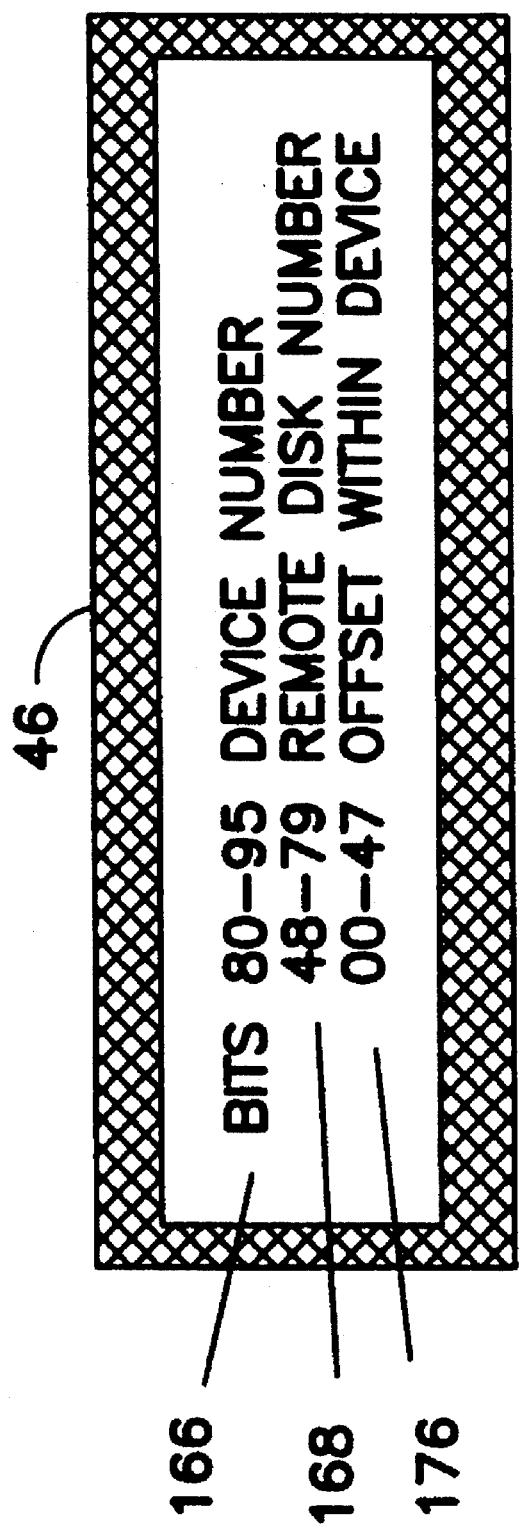
FIG. 24 illustrates the structure of a Storage Address Identifier.

When a Data Set 22 exists on an RSM, its identifier (FDLE 72 or SLE 28) can exist on permanent media, which allows each RSM disk to be defined for direct access. In FIG. 24, an SAI field 46 is further defined as having three distinct fields: Device Number 166 (2 bytes), Remote Disk Number 168 (4 bytes) and Offset Within Device 170 (6 bytes). The Device Number field 166 provides for up to $2^{16}$ (roughly 65 thousand) possible devices, more than sufficient for even the largest mainframes. The Remote Disk Number field 168 provides for up to $2^{32}$ (roughly 4 billion) disks per physical device. The Offset Within Device field 170 provides for $2^{48}$ (or trillions) bytes within each physical device. Although these numbers may seems excessive now, consider the increase in the capacity of storage devices over the last 10 years.

In most microcomputer environments it would be possible to assign a unique device number to each standard or RSM disk. However, this is a highly limited solution because a micro-computer will normally have only a fraction of the physical devices or RSM disk found on a mainframe-computer. The idea is to keep the structures standard across all computing environments.

When a request is made for data on that RSM disk, the FDEP 20 can directly or indirectly cause a message to appear, which prompts the user to insert a specific disk into a specific device to complete a data request. Once, the RSM disk had been inserted, processing could commence normally.

CONCLUSION

This concludes the description of the preferred embodiment of the invention. In summary, a method and apparatus for data storage and retrieval have been described. In a computer having one or more secondary storage devices attached thereto, a Finite Data Environment Processor (FDEP) manages Data Sets residing on the secondary storage devices and in memory using Set Lists (SLs) and General Record Pointers (GRPs). The Data Sets contain either data or logical organizational information. The Set Lists comprise Data Sets organized into a hierarchy. The General Record Pointers identify information in terms of Data Sets and records within them. Using the principal idea that a Data Set is uniquely identifiable, the present invention eliminates problems normally associated with referencing the location of data after the data has been moved.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE I

```
;;CURRENT_DS    FDI, GRP, OR EGRP TO STARTING AND ON_GOING
               DATA SET FOR TRAVERSAL
;;CUR_CLASS    DATA SET CLASS FOR CURRENT_DS
CALL TOP_DOWN ( MY_DATA_SET )          ;;START RECURSION
PROCEDURE TOP_DOWN ( CURRENT_DS )
   DISPLAY OR ACCUMULATE NAME OF CURRENT_DS
   CUR_CLASS = DETERMINE CLASS OF DATA SET CURRENT_DS
   SELECT ( CUR_CLASS )
       WHEN    ( PDS )
               RETURN
       WHEN    ( CDS )
               SEARCH FOR ALL SLES
                   WHOSE PARENT IS CURRENT_DS.
               FOR ( EACH LOCATED SLE )
                   CALL TOP_DOWN ( SLE )
               RETURN
       WHEN    ( FDS )
               LOAD SL IF NOT ALREADY IN MEMORY
               SEARCH FOR ALL SLES WITH A NULL
                   PARENT ( ROOT SLEs )
               FOR ( EACH LOCATED SLE )
                   CALL TOP_DOWN ( SLE )
               RETURN
   END_SELECT
END_PROCEDURE
```

What is claimed is:

1. An apparatus for managing data in a computer having one or more memory devices characterized by:

(a) one or more Data Sets stored in one or more of the memory devices, wherein both data and logical organization are recorded in the Data Sets;

(b) one or more Set Lists stored in one or more Data Sets, wherein a Set List comprises a list of Set List Elements, and the Set List Elements are stored in an arbitrary order in any of the Set Lists;

(c) each Set List Element comprising:

(1) a Self Identification used to identify the Set List Element and an associated Data Set;

(2) an identification of a parent Set List Element in any of the Set Lists for defining a logical hierarchy of the Set List Elements, wherein a predefined value for the identification of the parent Set List Element indicates that the Set List Element is a root Set List Element in the logical hierarchy, and a value other than the predefined value for the identification of the parent Set List Element indicates the Set List Element is logically subordinate to the parent Set List Element in the logical hierarchy;

(d) means for manipulating the logical hierarchy by modifying the identifications of the parent Set List Elements;

(e) one or more General Record Pointers stored in one or more of the memory devices, wherein each General Record Pointer identifies a specific one of the Data Sets; and (f) means for accessing the Data Sets, further comprising means for searching the Set Lists to locate a desired Set List Element therein having a Self Identification matching a specified General Record Pointer.

2. The apparatus as defined in claim 1, wherein each General Record Pointer comprises an identification of a site and a value unique for the site.

3. The apparatus as defined in claim 1, further characterized by means for creating a new Data Set within the logical hierarchy, comprising means for generating and assigning a unique General Record Pointer to the new Data Set, means for allocating a storage location for physical data associated with the new Data Set, means for creating a new Set List Element containing the General Record Pointer as its Self Identification, and means for recording the storage location in the newly created Set List Element.

4. The apparatus as defined in claim 1, further characterized by means for deleting an existing Data Set from the logical hierarchy by setting an indicator in the Set List Element associated therewith to a deleted state.

5. The apparatus as defined in claim 1, wherein the means for manipulating is characterized by means for moving a Data Set in the logical hierarchy by altering the identification of the parent Set List Element stored in the Set List Element associated with the Data Set.

6. The apparatus as defined in claim 1, wherein the mean for manipulating is characterized by means for promoting a Data Set within the logical hierarchy by replacing the identification of the parent Set List Element in the Set List Element associated with the Data Set with an identification of a parent Set List Element stored in the parent Set List Element.

7. The apparatus as defined in claim 1, wherein the means for manipulating is characterized by means for inserting a Data Set within the logical hierarchy to a position between a subordinate Set List Element and a superior Set List Element, further comprising means for creating a new Set List Element, means for recording a General Record Pointer associated with the Data Set as the Self Identification in the new Set List Element, means for recording the Self Identification of the superior Set List Element as the identification of the parent Set List Element in the new Set List Element, and means for recording the Self Identification of the new Set List Element as the identification of the parent Set List Element in the subordinate Set List Element.

8. The apparatus as defined in claim 1, further characterized by means for storing a Set List Element in an arbitrary one of the Set Lists, wherein the Set List Element contains an identification of a parent Set List Element residing in another Set List.

9. The apparatus as defined in claim 1, further characterized by means for locating a specific Set List Element by searching all Set Lists, regardless of the logical hierarchies defined by the Set List Elements.

10. The apparatus as defined in claim 1, wherein a Data Set is identified solely by a General Record Pointer, the apparatus further characterized by means for locating a desired Data Set by arbitrarily selecting Set Lists, means for arbitrarily searching Set List Elements within the selected Set Lists to identify a Set List Element with a Self Identification matching the General Record Pointer for the desired Data Set, wherein the identified Set List Element contains a storage location for the desired Data Set.

11. The apparatus as defined in claim 1, further characterized by means for associating a plurality of Set List Elements with a given Data Set, wherein each of the Set List Elements are in a different logical hierarchy.

12. The apparatus as defined in claim 1, further characterized by descendant view means for identifying a starting Set List Element and for locating one or more subordinate Set List Elements having an identification of a parent Set List Element matching the Self Identification of the starting Set List Element, further comprising means for repeating the means for identifying and means for locating using the matching Set List Elements for all subordinate Set List Elements.

13. The apparatus as defined in claim 1, further characterized by ancestor view means for identifying a starting Set List Element and for locating one or more Set List Elements having a Self Identification matching an identification of a parent Set List Element of the starting Set List Element, further comprising means for repeating the means for identifying and means for locating using the matching Set List Elements until a root Set List Element is encountered.

14. The apparatus as defined in claim 1, wherein the means for manipulating is characterized by means for copying a Data Set and all immediate subordinate Data Sets by copying the Set List Elements associated therewith.

15. The apparatus as defined in claim 14, wherein the means for copying is further characterized by:

(i) means for creating a new Set List Element associated with the copied Data Set;

(ii) means for generating a new General Record Pointer and recording it as a Self Identification in the copied Set List Element;

(iii) means for duplicating the contents of the copied Data Set to a new Data Set and identifying the Data Set with the new General Record Pointer;

(iv) means for replacing the storage location in the new Set List Element with a storage location for the new Data Set; and (v) means for repeating the means for creating (i) through the means for replacing (iv) for subordinate Set List Elements.

16. The apparatus as defined in claim 1, further characterized by means for associating a plurality of Set List Elements with a given Data Set, wherein each of the Set List Elements are in a different position in the logical hierarchy.

17. The apparatus as defined in claim 16, wherein each Set List Element associated with the Data Set has an identical Self Identification.

18. The apparatus as defined in claim 16, wherein each Set List Element associated with the Data Set has a different identification of a parent Set List Element thereby resulting in the different position in the logical hierarchy.

19. The apparatus as defined in claim 1, further characterized by means for detecting erroneous control data.

20. The apparatus as defined in claim 19, wherein the means for detecting is characterized by means for detecting corruption in the Set Lists and Set List Elements.

21. The apparatus as defined in claim 20, wherein the means for detecting is characterized by means for searching a Set List for a desired Set List Element and means for performing a checksum test on the desired Set List Element to establish a test result, wherein a match between the test result and a checksum value stored in the desired Set List Element indicates a lack of corruption.

22. The apparatus as defined in claim 20, wherein the means for detecting is characterized by means for searching a Set List for a desired Set List Element and means for searching for a Set List Element corresponding to the identification of the parent Set List Element stored in the desired Set List Element, wherein a failure to find the parent Set List Element indicates corruption.

23. The apparatus as defined in claim 20, wherein the means for detecting is characterized by means for searching a Set List for a desired Set List Element and means for performing a content validity test on the associated Data Set to establish a test result, wherein a match between the test result and a checksum value stored in the Set List Element indicates a lack of corruption.

24. The apparatus as defined in claim 20, wherein the means for detecting corruption is characterized by means for correcting Set List Element corruption, comprising:

(i) means for creating a new Set List Element;

(ii) means for generating a new General Record Pointer and recording it as the Self Identification of the new Set List Element;

(iii) means for recording the storage location of the associated Data Set in the new Set List Element; and (iv) means for identifying the new Set List Element as a recovered Set List Element.

25. The apparatus as defined in claim 1, further comprising a plurality of sites, each site having one or more computers and memory devices situated thereat, wherein each site is identified by a unique site identification.

26. The apparatus as defined in claim 25, further characterized by means for uniquely identifying any given Data Set across any number of sites.

27. The apparatus as defined in claim 25, further characterized by means for locating a Data Set beyond the confines of a single site, further comprising means for searching for the Data Set beginning at a starting site and proceeding to other sites.

28. The apparatus as defined in claim 25, further characterized by means for moving a Data Set within the logical hierarchy by altering the identification of the parent Set List Element associated therewith, wherein the parent Set List Element exists in a Set List at a different site.

29. The apparatus as defined in claim 25, further characterized by means of copying a Data Set within the logical hierarchy from a first site to a different site.

30. The apparatus as defined in claim 25, further comprising means for storing the Data Sets identified within a given Set List in differing ones of the memory devices.

31. The apparatus as defined in claim 1, further comprising means for storing associated Data Sets and Set List Elements in differing ones of the memory devices.

32. The apparatus as defined in claim 31, wherein the means for storing comprises:

(i) means for selecting a first memory device for storing a Data Set;

(ii) means for determining that the first memory device does not contain sufficient storage for the Data Set;

(iii) means for selecting a second memory device for storing the Data Set;

(iv) means for repeating the means for selecting (i) through the means for selecting (iii) until a memory device with sufficient memory is found; and (v) means for updating the storage location contained in the Set List Element associated with the Data Set to reflect the selected memory device.

33. The apparatus as defined in claim 1, further comprising a Finite Data Environment Processor performed by the computer, the Finite Data Environment Processor comprising means for maintaining a Finite Data List containing one or more Finite Data List Elements, wherein each Finite Data List Element identifies a storage location of one of the Set Lists, and the Finite Data List Elements are stored in an arbitrary order in the Finite Data List.

34. The apparatus as defined in claim 33, further comprising means for locating a desired Data Set by arbitrarily selecting Set Lists identified by the Finite Data List Elements.

35. The apparatus as defined in claim 33, further comprising means for detecting erroneous control data.

36. The apparatus as defined in claim 35, wherein the means for detecting comprises means for detecting corruption in the Finite Data List and Finite Data List Elements.

37. The apparatus as defined in claim 36, wherein the means for detecting corruption comprises means for searching the Finite Data List for a Finite Data List Element and means for performing a checksum test on each Finite Data List Element to establish a test result, wherein a match between the test result and a checksum value stored in the Finite Data List Element indicates a lack of corruption.

38. The apparatus as defined in claim 36, wherein the means for detecting corruption comprises means for searching the Finite Data List for a Finite Data List Element and means for performing a Set List content validity test, wherein the Set List is loaded and a checksum test performed on the contents thereof to establish a test result, wherein a match between the test result and a checksum value found in the Finite Data List Element indicates a lack of corruption.

39. The apparatus as defined in claim 36, wherein the means for detecting corruption comprises means for correcting Finite Data List Element corruption, comprising:

(i) means for creating a new Finite Data List Element;

(ii) means for generating a new General Record Pointer and recording it in a Self Identification for the Finite Data List Element;

(iii) means for recording the storage location for the Data Set in the Finite Data List Element; and (iv) means for identifying the Finite Data List Element as a recovered Finite Data List Element.

\* \* \* \* \*